United States Patent [19]

Owashi et al.

[11] Patent Number: 5,063,437
[45] Date of Patent: Nov. 5, 1991

[54] METHOD AND APPARATUS FOR PROCESSING A COLOR VIDEO SIGNAL

[75] Inventors: Hitoaki Owashi, Katsuta; Hiroyasu Ohtsubo, Yokohama; Masataka Sekiya, Mito; Kohji Minabe; Hideo Nishijima, both of Katsuta; Michio Masuda, Yokohama; Morito Rokuda, Katsuta, all of Japan

[73] Assignee: Hitachi, Ltd., Tokyo, Japan

[21] Appl. No.: 344,402

[22] Filed: Apr. 28, 1989

[30] Foreign Application Priority Data

Apr. 30, 1988 [JP] Japan .................. 63-105401
Aug. 5, 1988 [JP] Japan .................. 63-194635

[51] Int. Cl.⁵ .......................................... H04N 9/64
[52] U.S. Cl. ................................. 358/22; 358/312
[58] Field of Search ...................... 358/312, 22, 11

[56] References Cited

U.S. PATENT DOCUMENTS

| | | | |
|---|---|---|---|
| 4,247,865 | 1/1981 | Mastronardi | 358/17 |
| 4,390,894 | 6/1983 | Raven | 358/36 |
| 4,451,857 | 5/1984 | Mikado | 358/312 |
| 4,833,523 | 5/1989 | Lentz | 358/17 |

FOREIGN PATENT DOCUMENTS

| | | | |
|---|---|---|---|
| 3480 | 1/1982 | Japan | 358/312 |
| 29297 | 2/1987 | Japan . | |
| 154978 | 7/1987 | Japan . | |
| 175078 | 7/1987 | Japan . | |
| 203488 | 9/1987 | Japan . | |
| 3583 | 1/1988 | Japan . | |

OTHER PUBLICATIONS

Gillies et al., VLSI Reillsations for Picture in Picture Flicker Free Television Display, IEEE Transactions on Consumer Electronics, vol. 34, No. 1, Feb. 1988, pp. 253-261.
Nikkei Electronics, No. 406, Oct. 20, 1986, pp. 195-214.
NEC Technical Journal, vol. 40, No. 3, Mar. 1987, pp. 49-52.
Nikkei Electronics, No. 406, Oct. 20, 1986, pp. 178-179.

Primary Examiner—John W. Shepperd
Attorney, Agent, or Firm—Antonelli, Terry, Stout & Kraus

[57] ABSTRACT

This invention relates to a method and apparatus for processing a color video signal. The processing method separates an input composite color video signal into a luminance signal and chrominance signal, demodulates the separated chrominance signal into color difference signals, stores the separated luminance signal and color difference signals in a memory, reads out the luminance signal and color differnece signals in units of 1-field period from the memory, implements the extension or reduction of the field period length alternately for every certain number of fields in reading out the luminance signal and color difference signals from the memory thereby to fix the phase relation between a residual chrominance signal component in the luminance signal read out of the memory and a chrominance signal produced by modulating the color subcarrier with the color difference signals read out of the memory, implements an intended signal processing for the readout signals, modulates the color subcarrier with processed color difference signals to produce a chrominance signal, and mixes the chrominance signal with processed luminance signal to produce a composite color video signal.

24 Claims, 21 Drawing Sheets

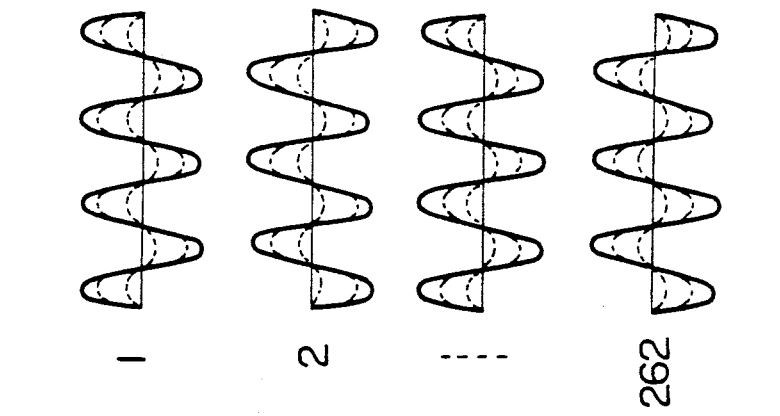
FIG. 1D (PRIOR ART) FOURTH FIELD
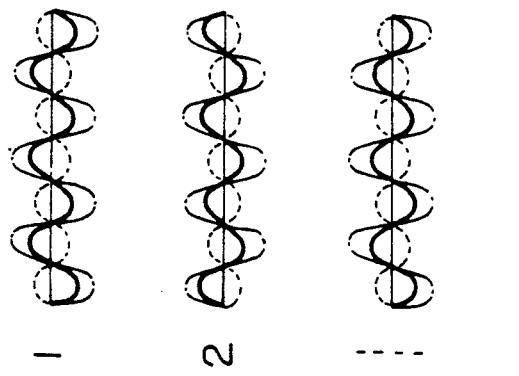
FIG. 1C (PRIOR ART) THIRD FIELD
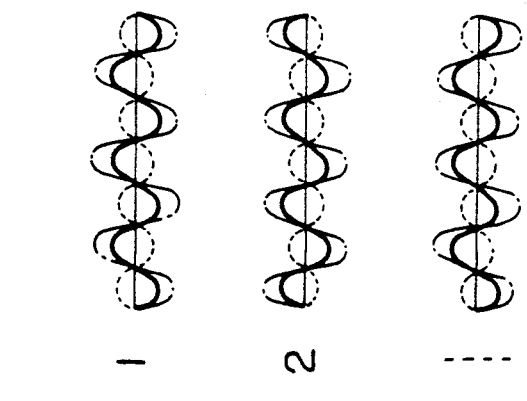
FIG. 1B (PRIOR ART) SECOND FIELD
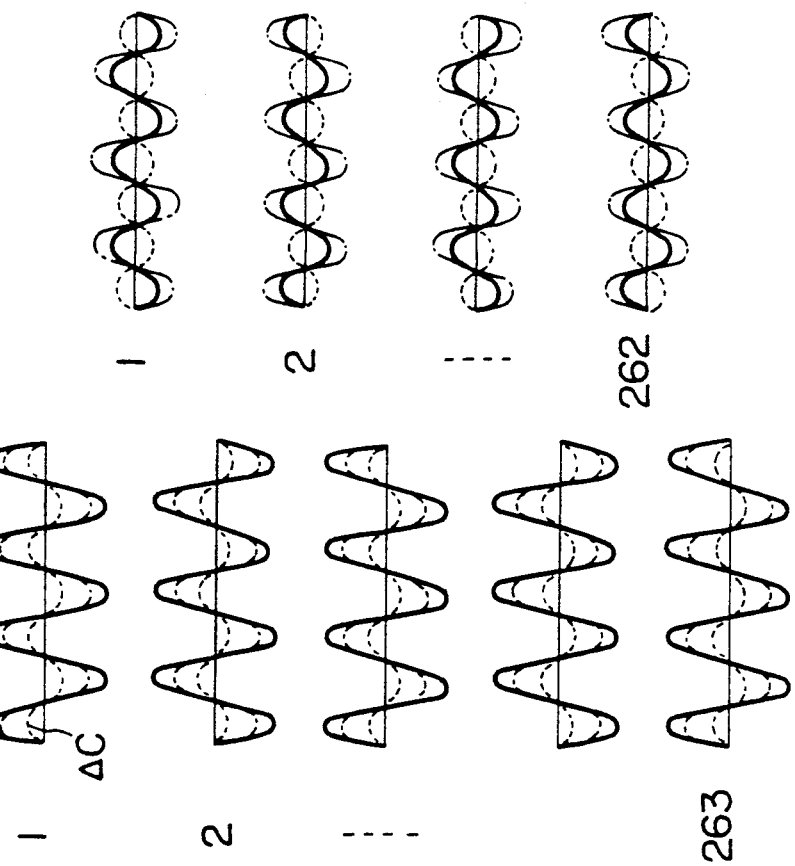
FIG. 1A (PRIOR ART) FIRST FIELD

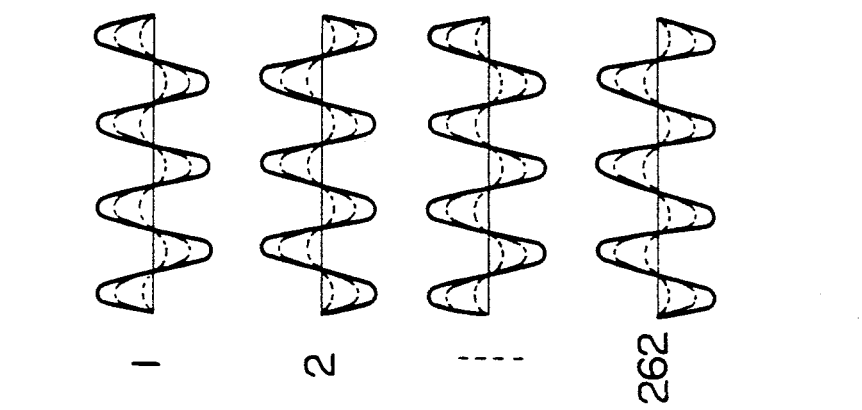
FIG. 2D FOURTH FIELD
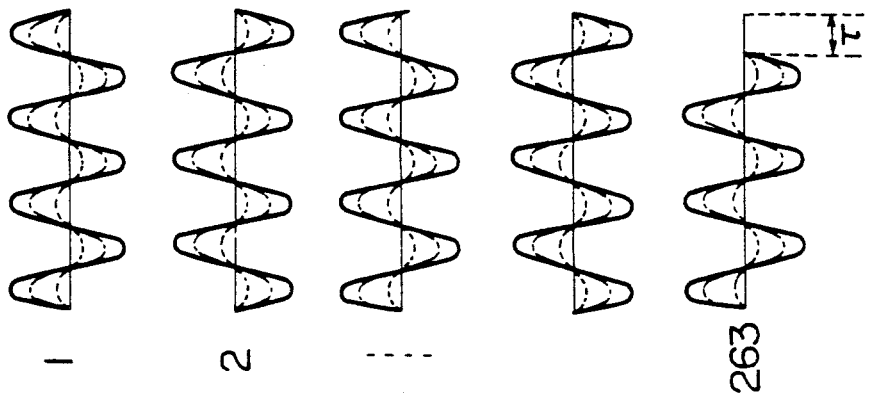
FIG. 2B SECOND FIELD
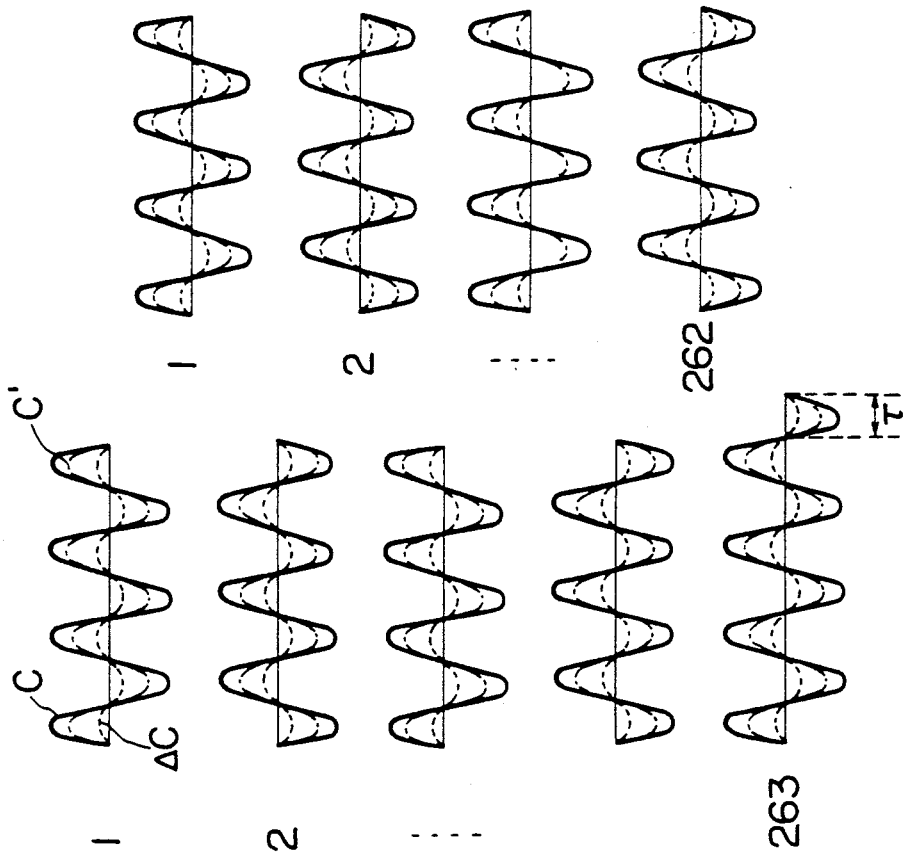

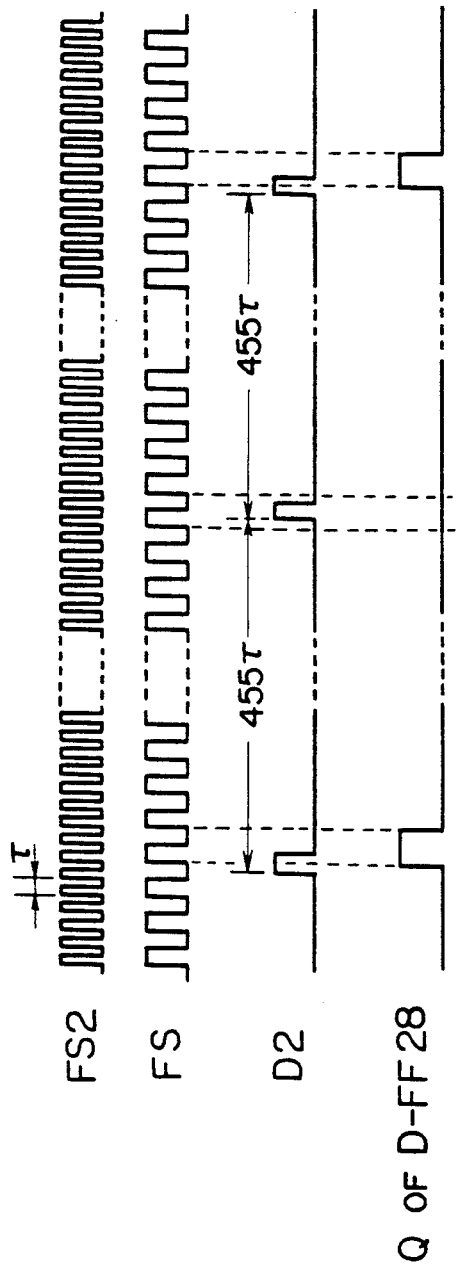

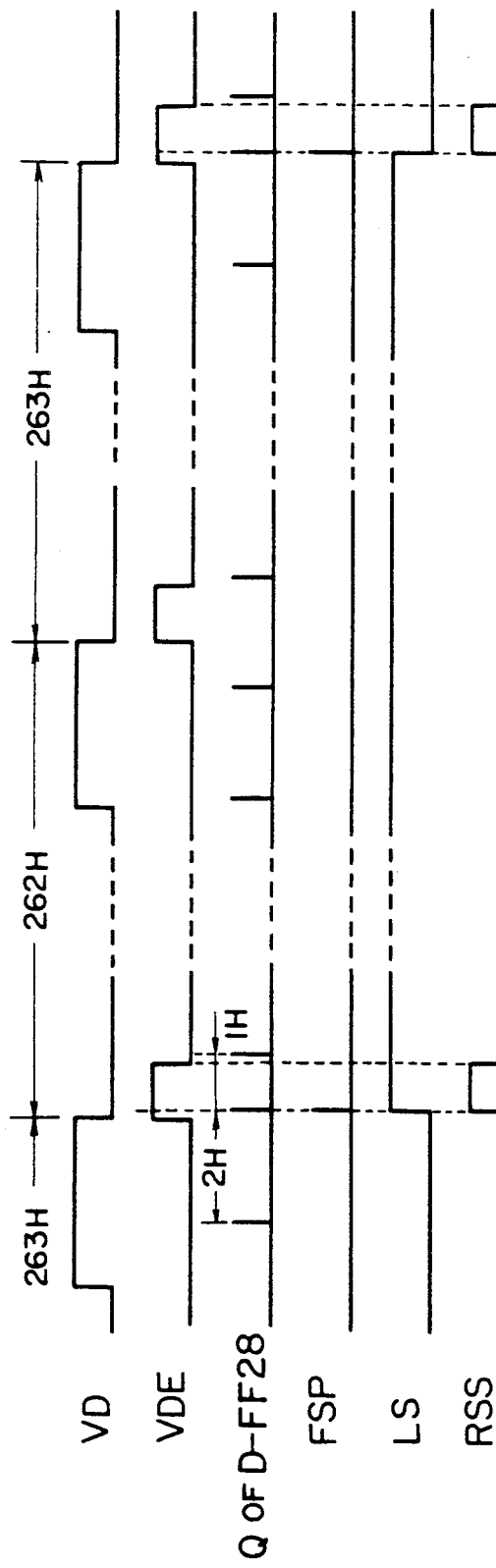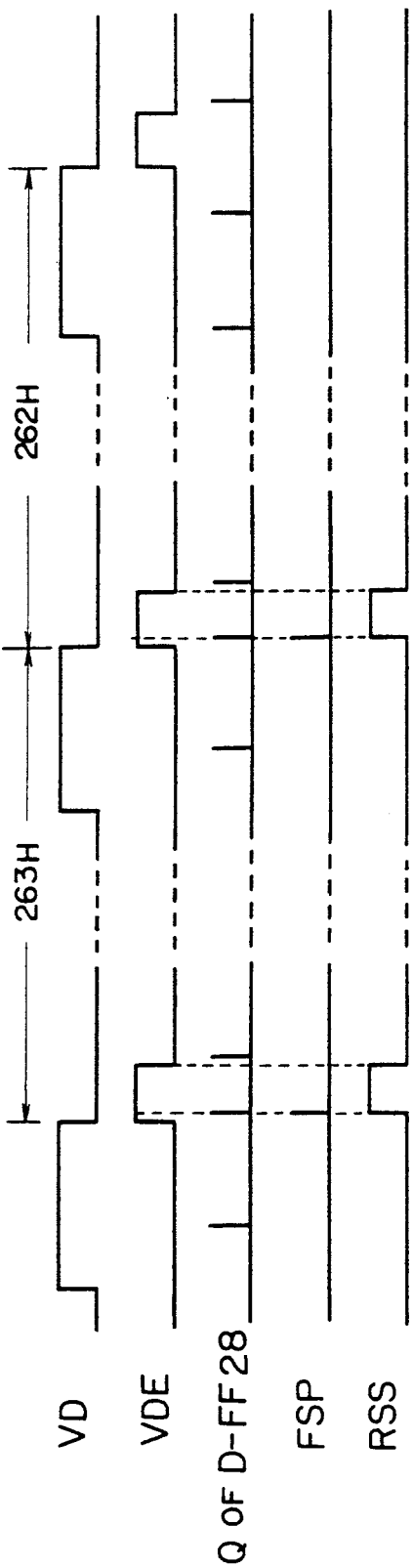

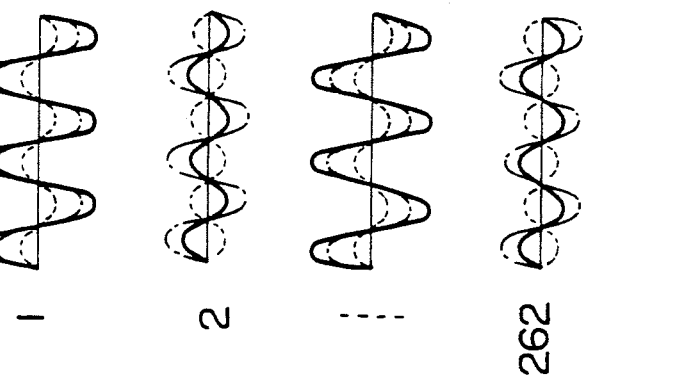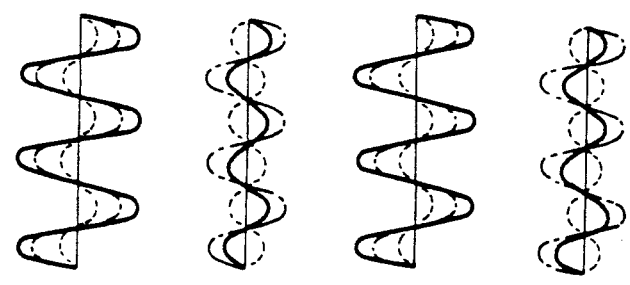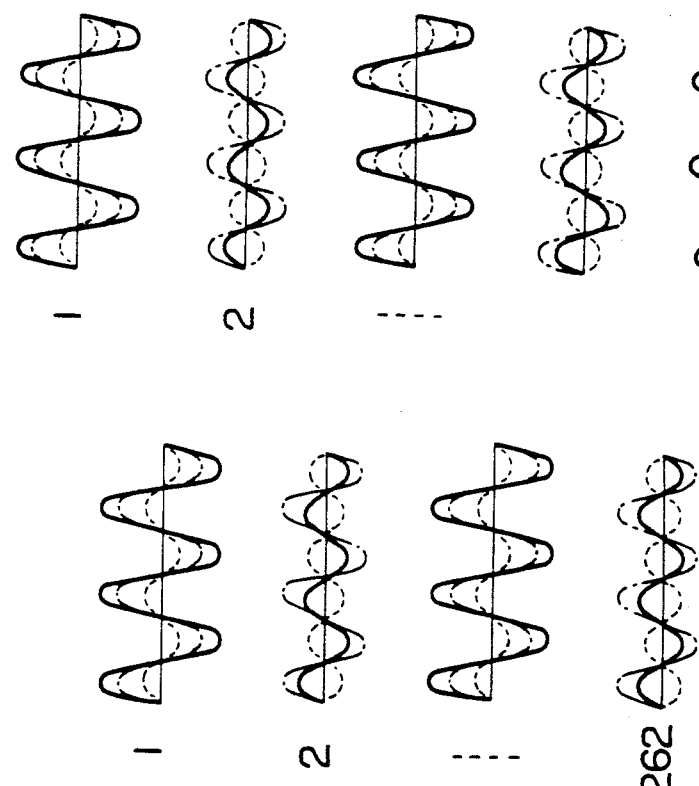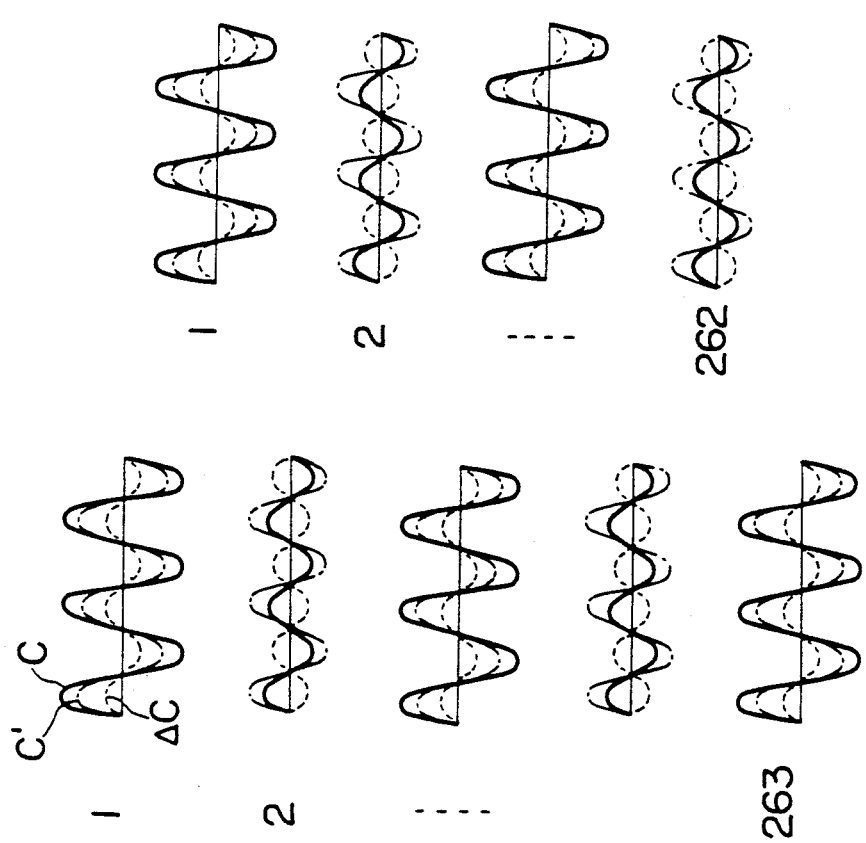
FIG. 8A FIRST FIELD
FIG. 8B SECOND FIELD
FIG. 8C THIRD FIELD
FIG. 8D FOURTH FIELD

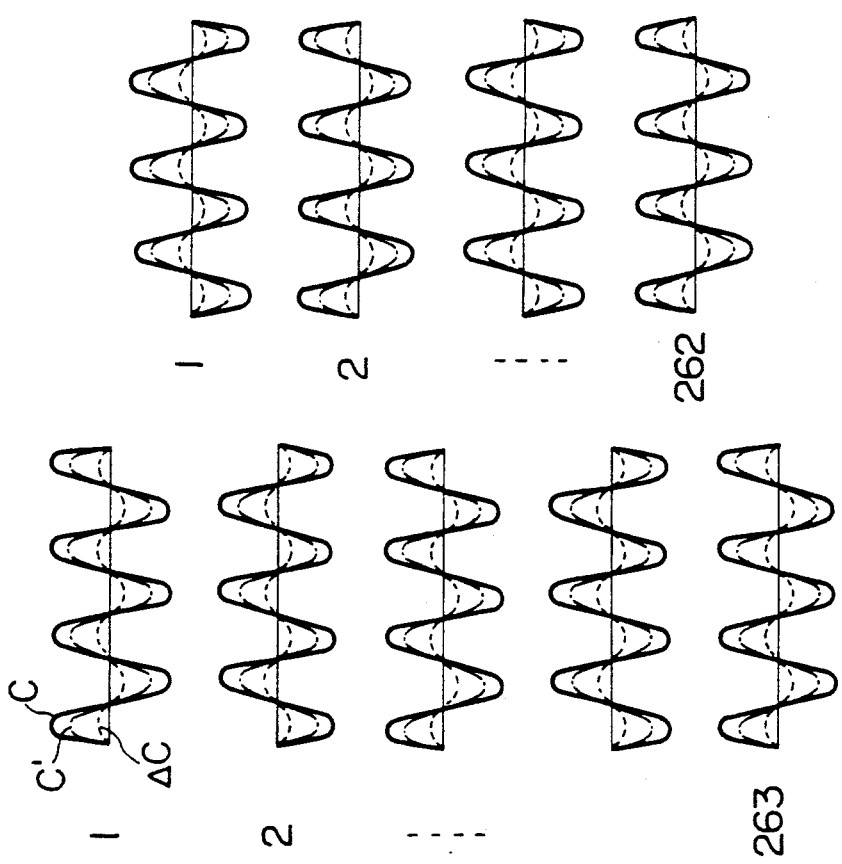

METHOD AND APPARATUS FOR PROCESSING A COLOR VIDEO SIGNAL

BACKGROUND OF THE INVENTION

This invention relates to a method of processing a color video signal using a memory.

There have been known techniques of still image process, mosaic process, noise reduction process, etc. for video signals using memories. An example is described, for example, in Nikkei Electronics, No. 406 (Oct. 20, 1986), pp. 195–214, in which a VTR incorporates a field memory and it is used to improve the picture quality in still image playback mode, slow playback mode and search mode.

When the still image playback command is encountered during the operation of the magnetic tape at the normal tape feed speed, a video signal for one field is extracted and written in the field memory, and a still image is reproduced by reading out the 1-field video signal from the field memory iteratively. In the case of slow playback, the magnetic tape is fed intermittently in a speed range of 1/5 to 1/30 time the normal playback speed, and video signals for one field is saved in the field memory during the period when the magnetic tape is stopping and the video signal is read out of the field memory during the period when the magnetic tape is moving. This technique is intended to reproduce a still image instantaneously and a smooth slow motion image regardless of the tape feed speed. In the case of search playback mode, signal portions with satisfactory tracking are extracted from signals that are picked up in the period when the magnetic head scans the tape twice and stored in the field memory, and these portions are connected to reproduce a video signal for one field. As a result, a playback image, with noise bars being removed, is reproduced. The field memory is written and read out independently, and a new sync signal is appended to the readout video signal thereby to eliminate the skew distortion.

In order for this conventional technique to prevent the discontinuity in phase of the color subcarrier at the connection of signals, the signals stored in the field memory consist of the luminance signal and color difference signals separated from the color video signal, i.e., component signals. Such a scheme of process is called "component signal processing method", and the adoption of this processing method also yields the stroboscopic effect, mosaic effect and solarization effect.

Another example is described, for example, in NEC Technical Journal, Vol. 40, No. 3 (March 1987), pp. 49–52, in which a field memory is used for the special effect and a 1-field delay element of cyclic noise reducer is used to reduce noises in normal playback mode.

A further scheme for providing a picture-in-picture effect is known (e.g., described in Nikkei Electronics, No. 406 (Oct. 20, 1986), pp. 178–179).

For the process of the special playback and noise reduction using a field memory, there have been a case of composite signal processing in which the color video signal is processed directly and a case of component processing. The composite signal processing requires a smaller memory capacity, but it is necessary for this method to device the retention of continuity of the color subcarrier before and after the signal processing. Therefore, the circuit becomes complex, and another problem is the degradation of picture quality, particularly the fidelity of color.

In contrast, in component signal processing, the signals stored in the field memory are the luminance signal and color difference signals in the base band. The sync signal and color burst signal need not be stored in the field memory, but instead they can be appended to the signal read out of the field memory, and therefore it does not need to device the continuity of the color subcarrier.

As a recent effort of enhancing the resolution of reproduced image, the luminance signal has its frequency band expanded to include the frequency band of the chrominance signal. However, the introduction of a color video signal including a broad-band luminance signal to the component signal processing creates a color flicker, resulting in a degraded picture quality. The following describes the color flicker by taking an example of still image reproduction.

In the still image processing based on the component signal processing, a color video signal for one field is separated into a luminance signal and a chrominance signal, and these signals are stored in a field memory. In the case of the NTSC standard television system, in which 525 scanning lines are produced by 1-interlace scanning, one field has 262.5 lines to be stored in the field memory. For the still image processing, each component signal stored in the field memory is read out iteratively. With the intention of avoiding a line flicker caused by interlace scanning, it is designed to read out 262 scanning lines or 263 scanning lines alternately for every field from the field memory.

The luminance signal read out of the field memory is appended with a sync signal and blanking signal. The color subcarrier is modulated with the readout color difference signals, and it is appended with a color burst and other signals to form a chrominance signal. The luminance signal has its vertical sync signal position set so that fields have 262 or 263 scanning lines alternately and the lines are laid by non-interlace scanning.

In the case of expanding the frequency band of the luminance signal to the extent of including the frequency band of the chrominance signal with the intention of enhancing the resolution of a reproduced image, a comb line filter is used as a separation circuit for separating the color video signal into the luminance signal and chrominance signal. However, due to an adjustment error of the comb line filter, the separated luminance signal includes a residual of chrominance signal in general. In addition, due to the crosstalk in the circuit or wiring following the comb line filter, the chrominance signal can leak into the separated luminance signal. Such a residual chrominance signal in the luminance signal will be termed crosstalk signal component $\Delta C$.

FIGS. 1A–1D are diagrams explaining the following of the chrominance signal read out of the field memory for each field, in the case of reproducing a single still image signal. In the figure, having a horizontal time axis and a vertical axis of signal level, signal C is the chrominance signal component in the composite color video signal formed by merging the luminance signal and chrominance signal, signal C' is the chrominance signal component immediately before it is stored in the memory, and $\Delta C$ is the residual chrominance signal component in the luminance signal as mentioned previously. Because of still image reproduction, the component signals (luminance signal and chrominance signal) for one field (263 horizontal scanning lines) is stored in the field memory. For playback, the same component signals are read out iteratively for each field from the field memory. FIG. 1A shows the field signal which is read out first. FIG. 1B shows the field signal of the second readout. Although the first and second field signals are the same field signal read out from the same field memory, the first and second fields are displaced from each other by one scanning line for the purpose of interlacing. The first and second fields in combination form a video signal for one frame. Similarly, the third and fourth fields, and thereafter an odd-numbered field and adjoining even-numbered field form a respective frame.

The luminance signal including the crosstalk chrominance signal component $\Delta C$ for one field is stored in the field memory, which is then read out such that configuous fields have 262 or 263 scanning lines alternately. In the following, attention is paid on the first through fourth fields. Since the component signals of the same field are read out iteratively from the field memory, the crosstalk chrominance signal component $\Delta C$ has the same phase relation with the horizontal sync signal (not shown, it is assumed to be located at the left end of each scanning line) among all fields, as shown in FIGS. 1A-1D.

In the NTSC system, the color subcarrier frequency $f_{sc}$ and the horizontal sync frequency $f_H$ relates with each other as follows.

$$F_{sc} = \frac{455}{2} F_H \quad (1)$$

Accordingly, each scanning line has a period which is an odd multiple of half the color subcarrier period.

The color difference signals read out of the field memory modulate a continuous color subcarrier to form a chrominance signal C'. The chrominance signal C' is shown by the dash-dot line in the FIGS. 1A-1D. It is assumed that the crosstalk chrominance signal component $\Delta C$ and chrominance signal C' have the same phase in the first field. The color subcarrier frequency $f_{sc}$ horizontal sync frequency $f_H$ are in the relation of equation (1), the crosstalks chrominance signal component $\Delta C$ and chrominance signal C' have their phase reversing with respect to the horizontal sync signal for every scanning line, the first field (odd-numbered field) comprises an odd number of scanning line, and a signal of the same field is read out iteratively from the field memory in the still image process. Based on these conditions, the crosstalk chrominance signal component $\Delta C$ and chrominance signal C' have opposite phase from each other. Similarly, the second field (even-numbered field) comprises an even number of scanning lines, and therefore in the third field, the crosstalk chrominance signal component $\Delta C$ and chrominance signal C' have opposite phases from each other as in the second field. The third field comprises an odd number of scanning lines, and therefore in the fourth field, the crosstalk chrominance signal component $\Delta C$ and chrominance signal C' have the same phase. The change in the phase relation between the crosstalk chrominance signal component $\Delta C$ and chrominance signal C' in every field is repeated for every fourth field.

When the produced chrominance signal C' and the luminance signal are merged to form a composite color video signal, the resulting composite color video signal has its chrominance signal C composed of the chrominance signal C' and crosstalk chrominance signal $\Delta C$. The chrominance signal C is the chrominance signal C' added by the crosstalk chrominance signal $\Delta C$ in the first and fourth fields and it is the chrominance signal C' subtracted by the crosstalk chrominance signal $\Delta C$ (addition in opposite phases) in the second and third fields, as shown by the solid line in FIGS. 1A-1D. As a result, the amplitude of chrominance signal C increases in the first and fourth fields and it decreases in the second and third fields.

On this account, the chrominance signal C has its amplitude increasing or decreasing at an interval of four fields, resulting in an increase or decrease of color saturation at an interval of four fields on the screen, which creates a color flicker.

Although the above explanation has assumed the crosstalk chrominance signal $\Delta C$ and chrominance signal C' to have the same phase, the color subcarrier of the chrominance signal C' is not necessarily always in-phase with the crosstalk chrominance signal C'. Therefore the phase relation in the first and fourth fields differs from that in the second and third fields. Namely, the chrominance signal C has different phase relations with the horizontal sync signal between these field pairs, resulting in the occurrence of color flicker in the hue direction. Although the above-mentioned color flicker does not arise in the color video signal processing system which deals with the luminance signal as a narrow-band signal, it becomes a serious problem when a broad-band luminance signal is adopted for the enhancement of screen resolution.

SUMMARY OF THE INVENTION

An object of this invention is to provide a method of processing a color video signal, in which, in processing a component signal with its luminance signal having an expanded based, the phase relation between the signals $\Delta C$ and C' is prevented from varying depending on fields as shown in FIGS. 1A-1D thereby to suppress the color flicker and eventually enhance the picture quality.

In order to achieve the above objective, the inventive method extends or reduces the field period length of the luminance signal and color difference signals at an interval of a certain number of fields alternately in reading out the signals from the field memory. In the case of reading out the signals for one field iteratively from the memory, the amount of extention and reduction is set equal to an odd multiple of half the period of the color subcarrier and the amount of extension and reduction can be made equal.

According to this invention, the luminance signal and color difference signals read out of the memory have their scanning line length set equal to a multiple of the period of the color subcarrier.

Furthermore, the inventive method adjusts, for every field, the phase of reading out the luminance signal and color difference signals from the memory. In the case of reading out the signals for one field iteratively from the memory, the readout phase for each field is synchronized with the reading color subcarrier, while in the case of sequential writing or reading by the memory, the readout phase is shifted by an odd multiple of half the period of the color subcarrier.

In any of the above cases, the crosstalk chrominance signal component in the luminance signal read out of the memory has a constant phase relation with the reading color subcarrier or chrominance signal, and color flicker does not occur.

BRIEF DESCRIPTION OF THE DRAWINGS

FIGS. 1A-1D are waveform diagrams in the case of the conventional color video signal processing method;

FIGS. 2A-2D are waveform diagrams according to one embodiment of the inventive color video signal processing method;

FIGS. 5A-5C, FIG. 6 and FIGS. 7A-7B are sets of timing charts showing the operation of the circuit shown in FIG. 4;

FIGS. 8A-8D are waveform diagrams according to another embodiment of the inventive color video signal processing method;

FIGS. 13A-13D are diagrams showing the moving image process by the circuit of FIG. 12;

DESCRIPTION OF THE PREFERRED EMBODIMENTS

Embodiments of this invention will be described with reference to the drawings.

Figure 3:
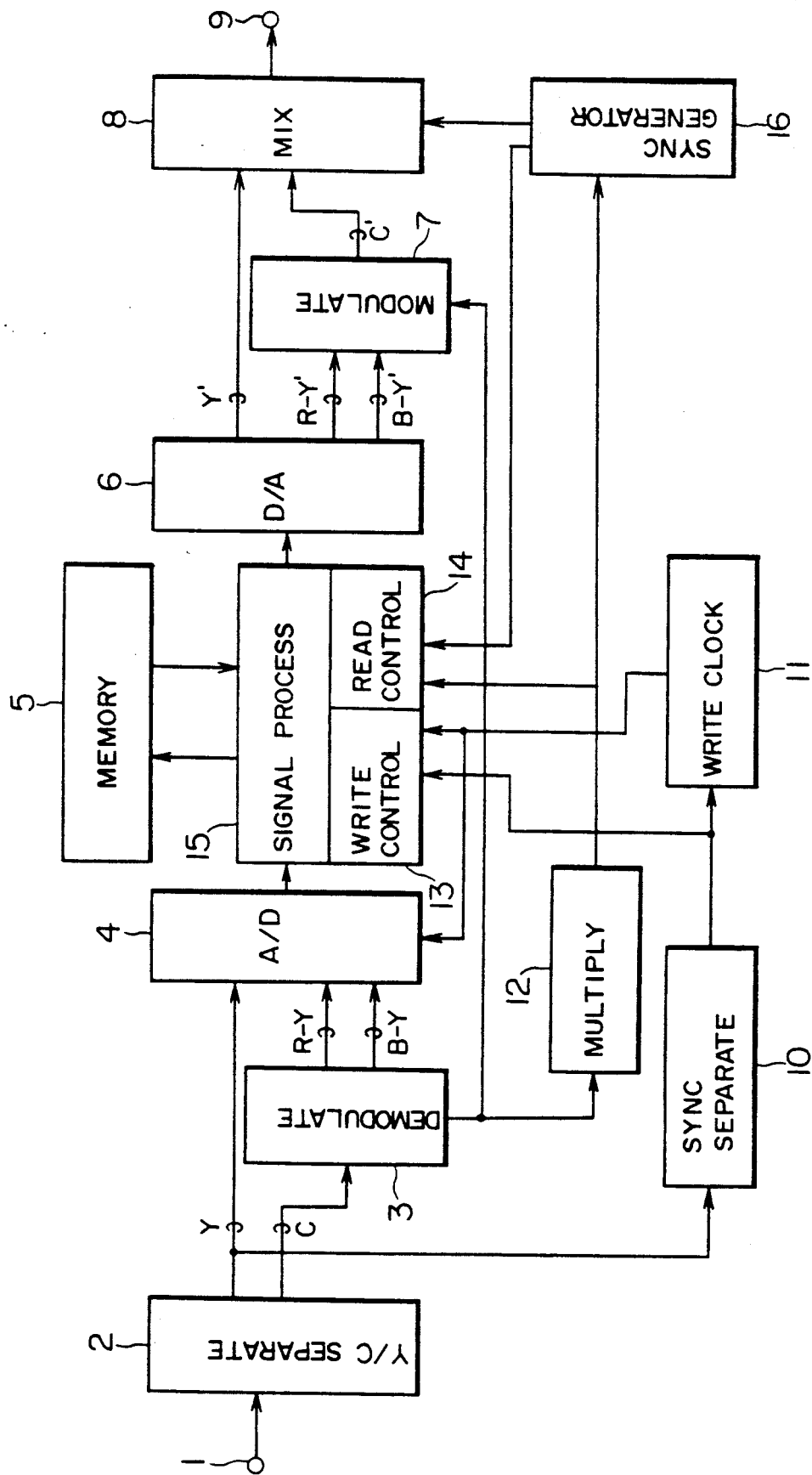
FIG. 3 is a block diagram showing, as an example, the apparatus which employs the inventive color video signal processing method.

FIG. 2 is a waveform diagram explaining an embodiment of the inventive color video signal processing method, and FIG. 3 is a block diagram showing an embodiment of the color video signal processor using the inventive method. In FIG. 3, indicated by 1 is an input terminal for a composite color video signal, 2 is a Y/C separation circuit, 3 is a demodulation circuit, 4 is an A/D conversion circuit, 5 is a field memory, 6 is a D/A conversion circuit, 7 is a modulation circuit, 8 is a mixing circuit, 9 is an output circuit, 10 is a sync separation circuit, 11 is a write clock generation circuit, 12 is a multiplication circuit, 13 is a write control circuit, 14 is a read control circuit, 15 is a signal processing circuit, and 16 is a sync signal generation circuit.

In case the color video signal processing circuit of FIG. 3 is applied to a video tape recorder, for example, the output of the magnetic head which traces the magnetic tape to pick up a recorded signal is amplified by a preamplifier and the resulting output is applied to the input terminal 1 of FIG. 3. The input terminal 1 can also receive a video signal from an external unit. Separate Y/C signals from an external unit bypass the Y/C separation circuit 2, and the luminance signal and chrominance signal are entered directly to the A/D converter 4 and demodulator 3, respectively. The output video signal on the output terminal 9 in FIG. 3 is delivered to a color image display unit (not shown). The luminance signal Y' and chrominance signal C' at the input of the mixing circuit 8 can be used as separate Y/C signals.

In FIG. 3, a color video signal is received on the input terminal 1, and the following example is assumed to implement the still image processing for this color video signal.

The color video signal is fed to the Y-C separation circuit 2, which comprises a comb line filter for example, and it is separated into a luminance signal Y and chrominance signal C. The chrominance signal C is fed to the demodulator 3, by which the signal is demodulated into two color difference signals R-Y and B-Y. The luminance signal Y is fed to the sync separation circuit 10, by which the sync signal is separated, and the write clock generator 11 produces a write clock from the sync signal. The luminance signal Y and color difference signals R-Y and B-Y are sampled and digitized by the A/D converter 4 which uses the write clock from the write clock generation circuit 11 as a sampling pulse. After the digital signal has been processed in the signal processing circuit 15, the write control circuit 13 which is supplied with the sync signal and clock signal from the sync separation circuit 19 and write clock generation circuit 11, respectively, stores digital data of luminance signal and color difference signals for one field in the field memory.

In this case, the luminance signal Y and color difference signals R-Y and B-Y may be digitized separately and stored in separate areas of the field memory, or alternatively these signals may be digitized with the same A/D converter on the basis of time-sliced multiplication and stored in separate areas or same area of the field memory 5. Both signals are rid of the blanking period before being stored in the field memory 5. Writing of 1-field data into the field memory 5, with their blanking period being removed, is controlled by the write control circuit 13 based on the sync signal provided by the sync separation circuit 10.

After data for one field has been stored in the field memory 5, it is next read out iteratively by the read control circuit 14. The demodulator 3 incorporates a color subcarrier generation circuit for demodulating the chrominance signal C. The generated color subcarrier is multiplied by the multiplying circuit 12 and the resulting read clock is fed to the read control circuit 14 and, at the same time, to the sync signal generation circuit 16, by which the reading sync signal is generated and fed to the read control circuit 14. The read control circuit 14 controls the reading of the field memory 5 in accordance with read clock and sync signal.

The read control circuit 14 controls the reading so that 262 lines or 263 lines are read out of the field memory 5 alternately in every field and the last scanning line (the 263-th scanning line) is longer or shorter than other scanning lines by an odd multiple (one fold in this embodiment) of half the period $2\tau$ of the color subcarrier alternately in every field having 263 scanning lines.

Namely, in the embodiment shown in FIGS. 2A–2D, the first and third fields have 263 scanning lines and the second and fourth fields have 262 scanning lines, with the last scanning line of the first field being made longer by time $\tau$ than other scanning lines and with the last scanning line of the third field being made shorter by time $\tau$ than other scanning lines.

The digital signal read out of the field memory 5 is processed by the signal processing circuit 15, and thereafter it is converted into analog signals by the D/A converter 6. The color difference signals R-Y' and B-Y' are fed to the modulation circuit 7, which modulates the color subcarrier from the demodulation circuit 3 and further appends the color burst signal to produce a chrominance signal C'. The chrominance signal C' is mixed with the luminance signal Y' from the D/A converter 6 and, after it is appended with the sync signal and blanking signal from the sync signal generation circuit 16, the resulting composite color video signal is delivered through the output terminal 9.

The signal processing circuit 15 is a known circuit having functions of rendering various special effects for the image. Special effects include the still image process, enlargement/reduction process, right-left interchange process, mosaic image process, solarization process, and noise reduction process.

An example of the signal processing circuit having the noise reduction function is described in U.S. Pat. No. 4,390,894 issued to Raven on June 28, 1983. Examples of the signal processing circuits having functions other than the noise reduction function are disclosed in Japanese Patent JP-A-62-175078 filed on Jan. 28, 1986 by Sony Corp., Japanese Patent JP-A-62-154978 filed on Dec. 27, 1985 by Toshiba Corp., Japanese Patent JP-A-62-29297 filed on Jul. 30, 1985 by Matsushita Electric Co., Ltd., Japanese Patent JP-A-62-203488 filed on March 3, 1986 by Mitsubishi Electric Corp., and Japanese Patent JP-A-63-3583 filed on June 24, 1986 by Matsushita Electric Co., Ltd. The processes of these special effect functions are not the substance of the present invention, and the explanation thereof will be omitted.

When the field memory 5 is read out, the crosstalk chrominance signal component $\Delta C$ mixed in the luminance signal Y' has a unique phase relation with respect to the horizontal sync signal in every field, as shown in FIGS. 2A–2D. Since the last scanning line of the first field is longer than other scanning lines by time length $\tau$ and the last scanning line of the third field is shorter than other scanning lines by $\tau$, the waveform is always continuous between adjacent fields. Since the chrominance signal C' is also produced by the modulation circuit 7 by modulating the continuous color subcarrier, it is invariably constant as shown by the dash-dot line in FIGS. 2A–2D.

Therefore, the crosstalk chrominance signal component $\Delta C$ and chrominance signal C' have the same phase relation among fields, and a merged version thereof is unique among fields. Although in FIGS. 2A–2D the crosstalk chrominance signal component $\Delta C$ is in-phase with the chrominance signal C', this case is the simple summation for fields, and the chrominance signal C in the color video signal provided by the mixing circuit 8 (FIG. 3) does not vary in phase and amplitude between fields, as shown by the solid line in FIGS. 2A–2D. Moreover, even if there is a phase difference between the crosstalk chrominance signal component $\Delta C$ and chrominance signal C', it is unique between fields, and therefore the chrominance signal C does not vary in its phase and amplitude between fields.

In this way, the color saturation and color flicker in the hue direction are suppressed.

According to this embodiment, the frequency interleave condition is removed and dot scrolling subsides, and consequently a complete quiecent image can be played back.

Although the field length extends or contracts in every field, they are alternate and constant, and therefore it is averaged out on the time axis of video signal across four fields. On this account, there is no progressive shift of phase between the input color video signal and the still image signal as a result of process, and when the still image signal is switched to the moving image signal, there is virtually no disturbance of synchronization in the transition from a still picture to a moving picture.

Although FIGS. 2A–2D show the interlacing of scanning lines in every field, non-interlacing scanning is also possible through the adjustment of the position of the vertical sync signal appended by the mixing circuit 8 (FIG. 3), as has been mentioned previously on the prior art.

Figure 4:
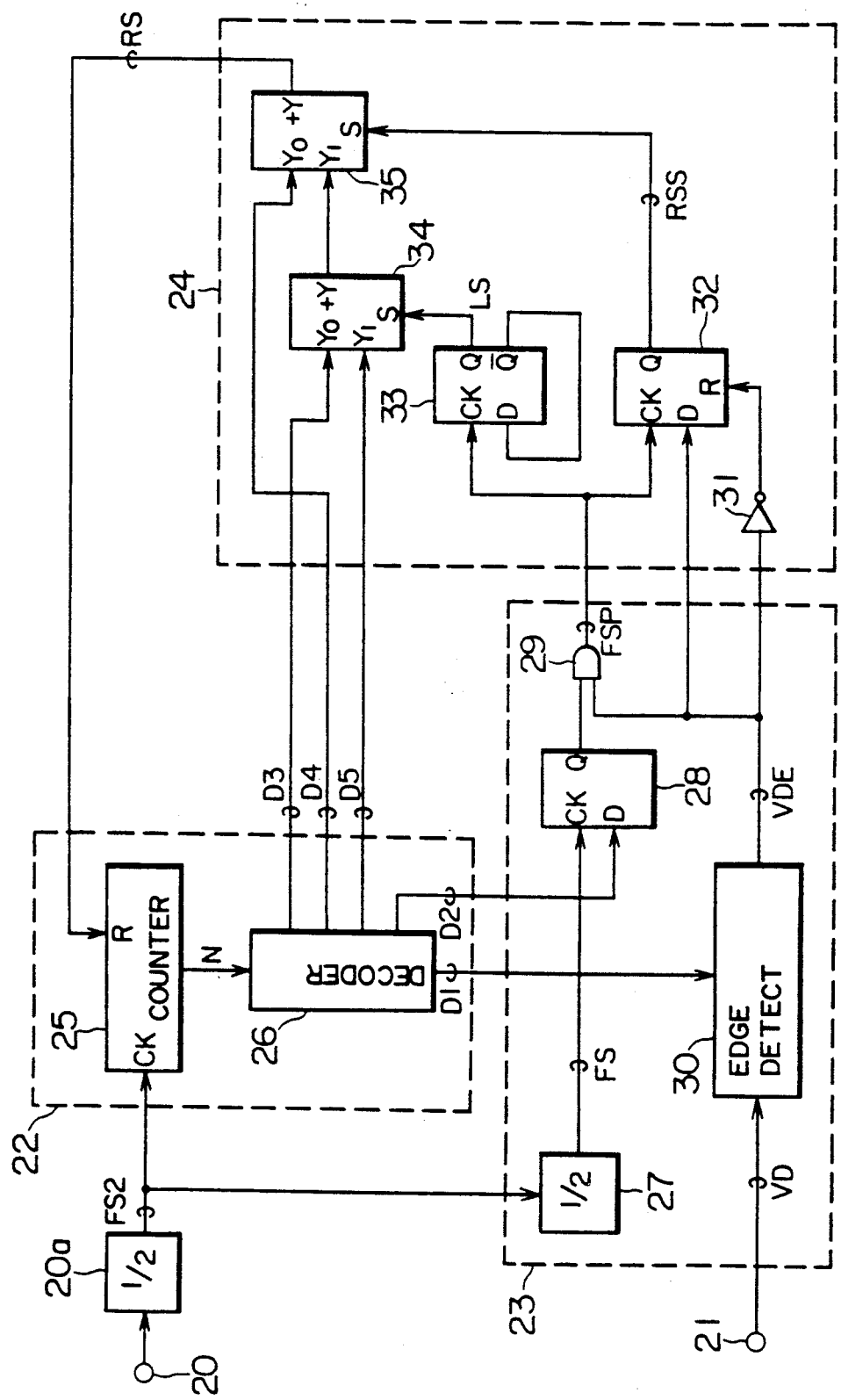
FIG. 4 is a block diagram showing an embodiment of the read control circuit in FIG. 3.

FIG. 4 is a block diagram showing an embodiment of the read control circuit 14 in FIG. 3. Indicated by 20 and 21 are input terminals, 20a is a half-demultiplier, 22 is a counting circuit, 23 is a field detection circuit, 24 is a phase adjustment circuit, 25 is a counter, 26 is a decoder, 27 is a half-demultiplier, 28 is a D-type flip-flop (D-FF), 29 is an AND gate, 30 is an edge detection circuit, 31 is an inverter, 32 and 33 are D-FFs, and 34 and 35 are multiplexers.

In the figure, the input terminal 20 receives a read clock provided by the multiplication circuit 12 (FIG. 3). The multiplication circuit 12 is assumed to multiply the frequency by four, and accordingly the read clock frequency $f_{s2}$ is $f_{sc}$ (where $f_{sc} = 455\, f_H/2$). The read clock is demultiplied by the demultiplier 20a and it is supplied as a clock FS2 with frequency $2f_{sc}$ to the counting circuit 22 made up of the counter 25 and decoder 26.

Figure 5A:
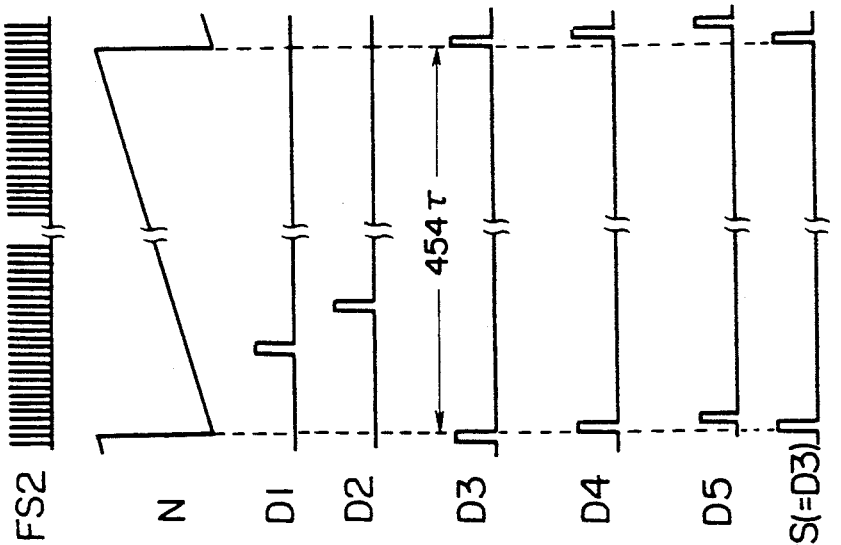

The count output of the counting circuit 22 is the read address of the memory 5. In the counting circuit 22, the counter 25 counts the clock FS2, as shown by N in FIGS. 5A–5C, and the resulting count value N is decoded by the decoder 26. The decoder 26 produces a pulse D3, D4 or D5 in response to the count value N of 454, 455 or 456, respectively. These pulses D3–D5 have a pulse width of $\tau$ (it is the period of the clock FS2), and are fed to the phase adjustment circuit 24. The phase adjustment circuit 24 normally selects the pulse D4 as a reset pulse RS, as shown in FIG. 5A, and counter is cleared by the reset pulse RS, as will be explained in more detail later. Accordingly, the counter 25 is cleared at each count of 455 and the interval of clearing is 455τ, i.e., the period of one horizontal scanning line (will be termed "1H").

Figure 5B:
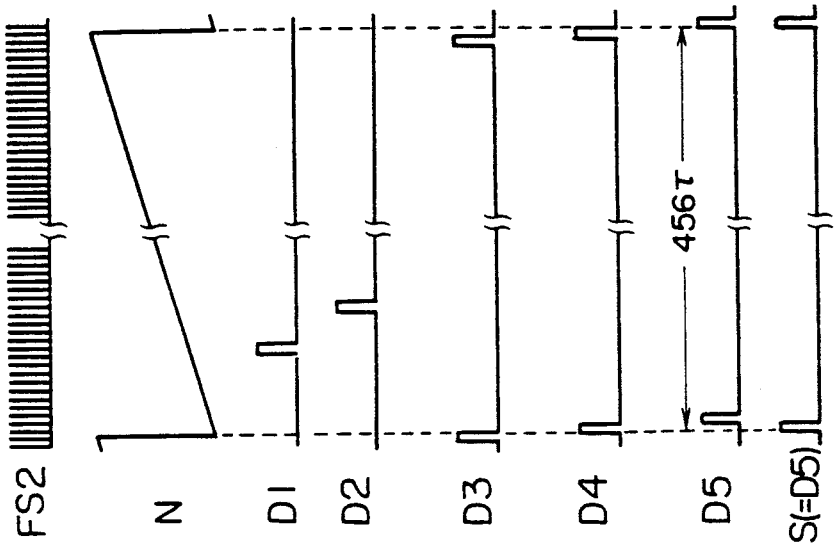
Figure 5C:
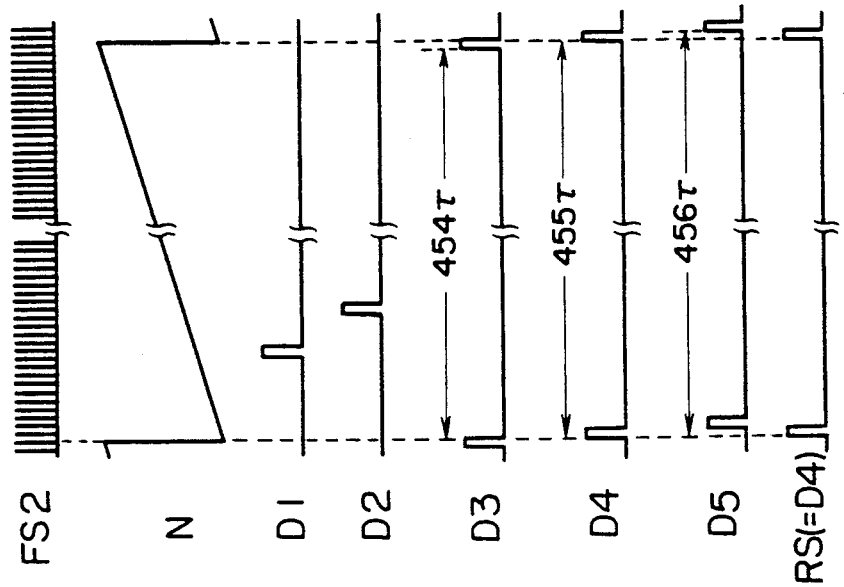

The phase adjustment circuit 24 selects the pulse D5 or D3 for the last scanning line, as shown in FIGS. 5B and 5C respectively, alternately in every second field having 263 scanning lines (FIGS. 2A-2D), and provides the selected pulse as a reset pulse RS for the counter 25. For example, if the counter 25 has a maximum count of 456 at the last scanning line of a field having 263 scanning lines, it will have a maximum count of 454 at the last scanning line of the next field having 263 scanning lines. Accordingly, the counter 25 has count periods of 456τ or 454τ at the last scanning lines of these fields.

The count value N of the counter 25 is also used for the control of column address (scanning line direction) of the field memory 5 (FIG. 3), and the reset pulse RS provided by the phase adjustment circuit 24 is also used for the control of the row address, although these are not shown in the figure. In consequent, the period of scanning lines read out of the field memory 5, which is normally 1H (i.e., 455τ), becomes 1H+1τ for the last scanning line of every second field having 263 scanning lines and 1H−τ for the last scanning line of every complementary second field.

The decoder 26 produces pulses D1 and D2, different in timing from the pulses D3-D5 and different in timing from each other depending on the count value N of the counter 25, having a pulse width of τ (refer to FIGS. 5A-5D).

The field detection circuit 23 and phase adjustment circuit 24 are to determine scanning lines having periods of 1H, 1H+1τ or 1H−1τ. The following describes the operation of these circuits.

The field detection circuit 23 includes a half-demultiplication circuit 27, a D-FF 28, an AND gate 29, and an edge detection circuit 30. The clock FS2 received on the input terminal 20 is demultiplied by two by the half-demultiplication circuit 27, and the resulting clock FS having a period of 2τ is supplied to the D-FF 28, which is also supplied with the pulse D2 as data D from the decoder 26.

At the commencement of operation of this embodiment, the phase adjustment circuit 24 selects the pulse D4 provided by the decoder 26 as a reset pulse RS. At this time, the counter 25 counts until 455, and the pulse D2 from the decoder 25 has a period of 455τ as shown in FIG. 6. Since the clock FS has a period of 2τ and the pulse D2 has a pulse width of τ, every second D2 pulse and every complementary second D2 pulse are different in phase by τ with respect to the clock FS, and the every second D2 pulse includes in its period the rising edge of the clock FS, while the every complementary second D2 pulse does not include the rising edge of the clock FS. The D-FF 28 sample-and-holds the data D at the rising edge of the clock FS. Accordingly, the D-FF 28 produces on its Q terminal an active-high pulse output having a period of 455τ×2 (i.e., 2H) and a pulse width of τ and being in-phase with the clock FS.

The input terminal 21 receives a vertical sync signal VD provided by the sync signal generation circuit 16, and it is fed to the edge detection circuit 30. The edge detection circuit 30 produces a pulse VDE (will be termed "vertical edge pulse") having a 1H pulse width and being in-phase with the pulse D1 provided by the decoder 26 immediately after the trailing edge of the vertical sync signal VD, as shown in FIGS. 7A and 7B. The edge detection circuit 30 with the above-mentioned function can be configured with a monostable multivibrator which generates a 1H-width pulse by being triggered at the trailing edge of the vertical sync signal VD and a D-FF which receives the 1H pulse as a data input and the pulse D1 from the decoder 26 as a clock, for example. The vertical edge pulse VDE and the Q output of the D-FF 28 are fed to the AND gate 29, by which a pulse within the active period of the vertical edge pulse VDE is extracted as a clock FSP from the output pulses on the Q terminal of D-FF 28.

Next, the phase adjustment circuit 24 includes an inverter 31, D-FFs 32 and 33 and multiplexers 34 and 35, and it selects any of the pulses D3-D5 from the decoder 26 as a reset pulse for the counter 25 in accordance with the vertical edge pulse VDE and clock FSP from the field detection circuit 23.

The D-FF 32 sample-holds the level of the vertical edge pulse VDE in response to the clock FSP, and thereafter it is cleared at the rising edge of a pulse that is an inverted version of the vertical edge pulse VDE through the inverter 31, i.e., the falling edge of the vertical edge pulse VDE. Accordingly, the D-FF 32 produces on its Q terminal a control pulse RSS which is high in the period from the clock pulse FSP until the falling edge (trailing edge) of the immediately following vertical edge pulse.

Another D-FF 33 sample-holds the level of the $\overline{Q}$ output in response to the clock FSP, and it produces on its Q terminal a control signal LS which reverses the level at each reception of the clock FSP.

The multiplexer 34 is controlled by the control signal LS so that it selects the pulse D3 that is the $Y_0$ input when the control signal LS is low, or selects the pulse D5 that is the $Y_1$ input when the LS is high. Another multiplexer 35 is controlled by the control signal RSS so that it selects, as a reset pulse RS, the pulse D4 that is the $Y_0$ input when the control signal RSS is high, or selects the output +Y (i.e., pulse D3 or D5) of the multiplexer 34 that is the $Y_1$ input when the RSS is low.

The vertical sync pulse VD received on the input terminal 21 has a period (i.e., width of field) of 262H or 263H alternately, and the edge detection circuit 30 produces the vertical edge pulse VDE at each arrival of the vertical sync signal VD.

Assuming both control signals LS and RSS to be low, as shown in FIG. 7A, the phase adjustment circuit 24 selects the pulse D4 as the reset pulse RS, and the counter 25 repeats the counting of 455. As a result, the decoder 26 produces pulses D1-D4 and their period is 455τ (1H).

The D-FF 28 produces on its Q terminal a 2H-period pulse output which is in-phase with the clock FS and timed to the pulse D2. If one of these pulses is located within the period of the vertical edge pulse VDE following the vertical sync signal VD at the end of a 263H field, the AND gate 29 produces a clock FSP in this period, causing the D-FF 32 to produce a high control signal RSS and the D-FF 33 to have its control signal LS to reverse to the high level. Consequently, the multiplexer 34 selects the $Y_1$ input and the multiplers 35 selects the output +Y of the multiplexer 34 during the active period of the control signal RSS, and eventually the multiplexer 35 selects the $Y_1$ input.

Accordingly, the counter 25, with its count value N being 455, is not suppleid with the reset pulse RS, and when N becomes 456, the decoder 26 produces the pulse D5, and it is selected as the reset pulse RS to clear the counter 25. Therefore, the pulses D1–D4 have their period extended to 1H+1τ only once immediately after the vertical sync signal VD, and thereafter it is restored to 1H. This implies that the pulses D1–D4 have their phase delayed by 1τ. As the counter 25 counts up to 456, the field memory 5 has its column address increased by one, resulting in an increased length of scanning lines from 1H by 1τ (a half period of the color subcarrier).

As a result of phase lag of D2 by 1τ, the output pulse on the Q terminal of the D-FF 28 is shifted by ½H, as will be appreciated from FIG. 6. Therefore, as shown in FIG. 7A, the pulse from the Q terminal of D-FF 28 is not included in the period of vertical edge pulse VDE of the next vertical sync signal VD at the end of a 262H field, and the clock FSP is not produced. Then, the pulse D4 is selected unchanged as a reset pulse RS, and the counter 25 repeats the counting of 455.

The period of vertical edge pulse VDE of the vertical sync signal VD at the end of the next 263H field includes the pulse from the Q terminal of D-FF 28, and the D-FF 32 produces the control signal RSS and the control signal LS goes low, causing the pulse D3 to be selected as a reset pulse RS, and the counter 25 is cleared when the count value N reaches 454. After that, the pulse D4 is selected as a reset pulse again, and the counter 25 repeats the counting of 455. Consequently, the last scanning line of 263H has a length of 1H−1τ.

The pulse D2 has its phase advanced by 1τ by the signal count of 454 by the counter 25, and the pulse from the Q terminal of D-FF 28 is shifted by 1H, as in the previous case of phase retardation. Therefore the period of vertical edge pulse VDE of the vertical sync signal VD at the end of the next 262H field does not include the pulse from the Q terminal of D-FF 28, and the clock FSP is not produced. Consequently, the counter 25 continues the counting of 455 unchanged.

As described, the field detection circuit 23 produces a clock FSP at the end of a 263H field, causing the phase adjustment circuit 24 to select the pulse D3 or D5 with a 454τ or 456τ period to clear the counter 25, so that the last scanning line of a 263H field has a length of 1H−1τ or 1H+1τ.

Although it can occur at the beginning of reading from the field memory 5, depending on the initial condition, that the clock FSP is generated within the vertical edge pulse VDE of the vertical sync signal at the end of a 262H field, the clock FSP is also produced at the end of the next 263H field, as shown in FIG. 7B, and eventually the operation settles as shown in FIG. 7A.

FIGS. 8A–8D are diagrams showing another embodiment of the inventive color video signal processing method.

This embodiment intends to make the horizontal sync frequency $f_H$ of the color video signal read out of the field memory 5 equal to the color subcarrier frequency $f_{sc}$ divided by an integer.

In FIGS. 8A–8D, each scanning line of each field has a length of 454τ or 456τ, and scanning lines stored in the field memory 5 are read out with the last τ period being appended thereto. For this purpose, the control circuit is configured with a counter which counts the clock FS2, as in the embodiment of FIG. 4, and a decoder which produces a pulse when the count value reaches 454 or 456 to reset the counter.

In this embodiment, as will be appreciated from FIGS. 8A–8D, the phase relation between the crosstalk chrominance signal ΔC and chrominance signal C' reverses for every scanning line. In case the signals ΔC and C' are in-phase for the first scanning line of the first field, these signals are in-phase for odd-numbered scanning lines of each field. The chrominance signal C is the sum of these signals ΔC and C'. For even-numbered scanning lines, these signals are opposite in phase, and the chrominance signal C is the difference of the signals ΔC and C'.

Although, the chrominance signal C has its amplitude modulated for every scanning line by the crosstalk chrominance signal component ΔC, all fields have the same amplitude for the same scanning line, and therefore color flicker does not occur. In case there is a phase difference between the crosstalk chrominance signal component ΔC and chrominance signal C', it merely results in a phase shift by this extent from the phase relation shown in FIGS. 8A–8D, and color flicker does not occur either.

Figure 9A:
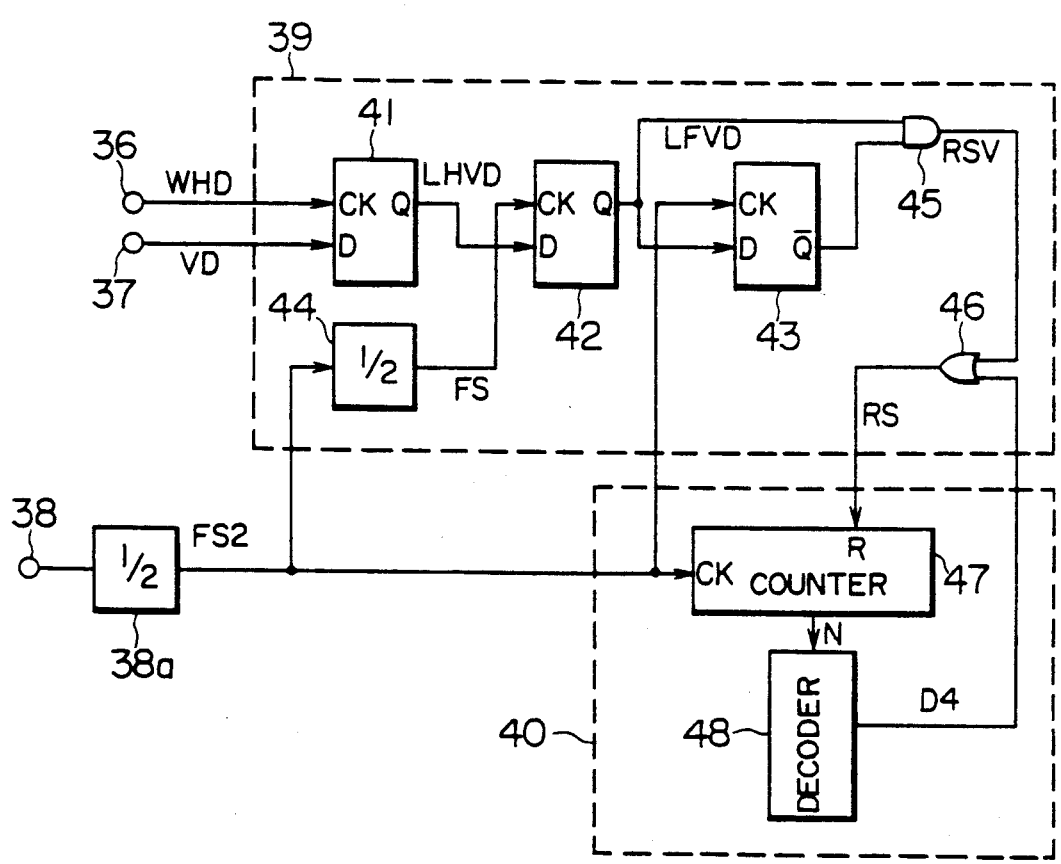
FIG. 9A is a block diagram showing specifically the read control circuit of the inventive color video signal processing method.

FIG. 9A is a block diagram showing a specific arrangement of the read control circuit 14 in FIG. 3. The circuit includes input terminals 36–38, a half-demultiplication circuit 38a, a phase adjustment circuit 39, a counting circuit 40, D-FFs 41–43, a half-demultiplication circuit 44, an AND gate 45, an OR gate 46, a counter 47, and a decoder 48.

This embodiment intends to synchronize the color video signal on the output terminal 9 with the color video signal on the input terminal 1 in FIG. 3, thereby preventing the discontinuity of sync signal, i.e., sync disturbance, when the color video signals on the input and output terminals 1 and 9 are linked for image reproduction.

Figure 9B:
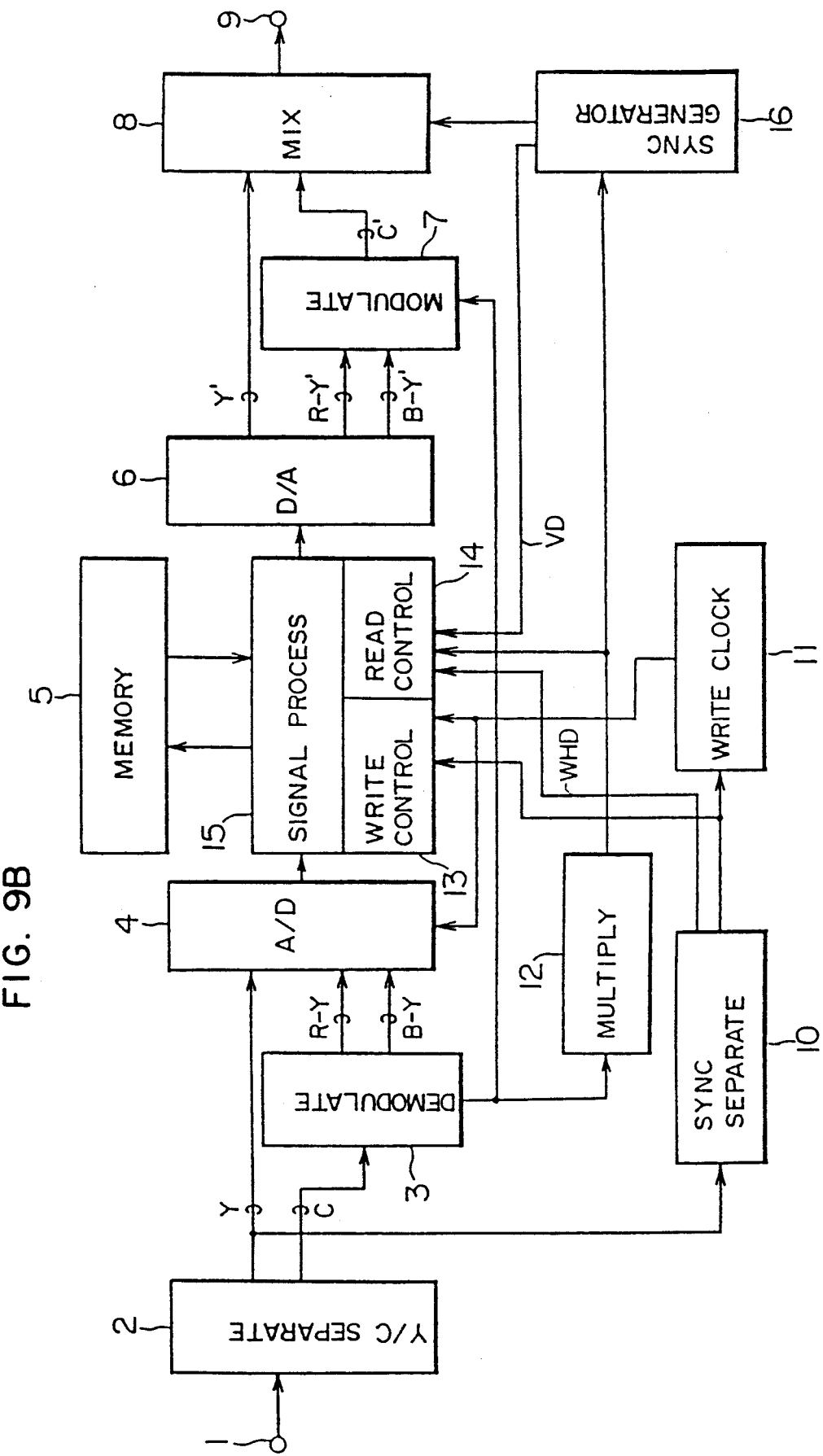
FIG. 9B is a schematic block diagram similar to FIG. 3 and showing the connections required by FIG. 9A.

In FIG. 9A, the input terminal 36 receives the horizontal sync signal WHD of writing provided by the sync separation circuit 10, the input terminal 37 receives the vertical sync signal VD provided by the sync signal generation circuit 16, and the input terminal 38 receives the read clock with a $4f_{sc}$ frequency provided by the multiplication circuit 12, as seen in FIG. 9B. The read clock is demultiplied by the half-demultiplication circuit 38a to produce a clock FS2 having a frequency of $2f_{sc}$ (period τ).

The counting circuit 40 includes a counter 47 and a decoder 48. The counter 47 counts the clock FS2, and delivers the count value N to the decoder 48, which produces a pulse D4 when the count value N is 455. The pulse D4 is fed through the OR gate 46 in the phase adjustment circuit 39, and it works as a reset pulse RS to clear the counter 47. The counter 47 is normally cleared by the pulse D4, and accordingly it repeats the counting of 455. The field memory 5 is controlled for its column address by the count value of the counter 47 and its row address by the pulse D4, so that it normally reads out scanning lines to provide a length of 455τ.

The phase adjustment circuit 39 includes D-FFs 41–43, a half-demultiplication circuit 44, an AND gate 45, and an OR gate 46.

Figure 10:
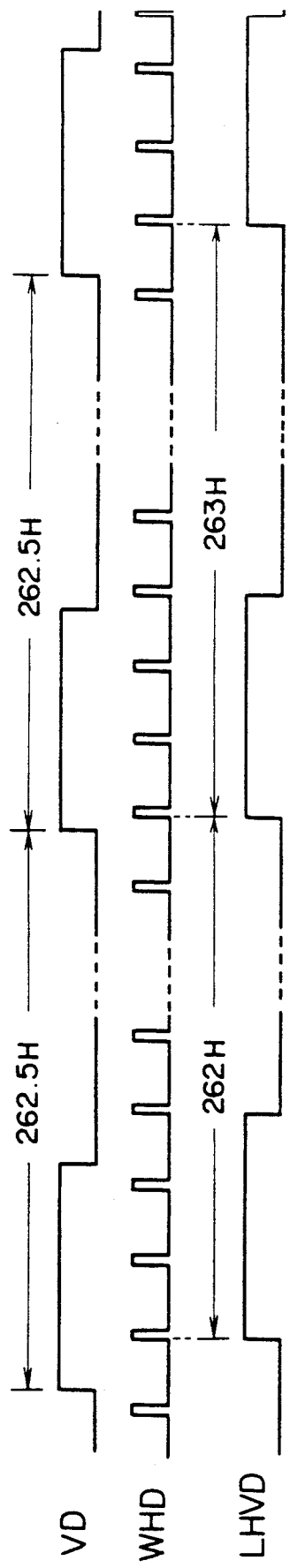
FIGS. 10 and 11 are timing charts showing the operation of the circuit shown in FIG. 9.
Figure 11:
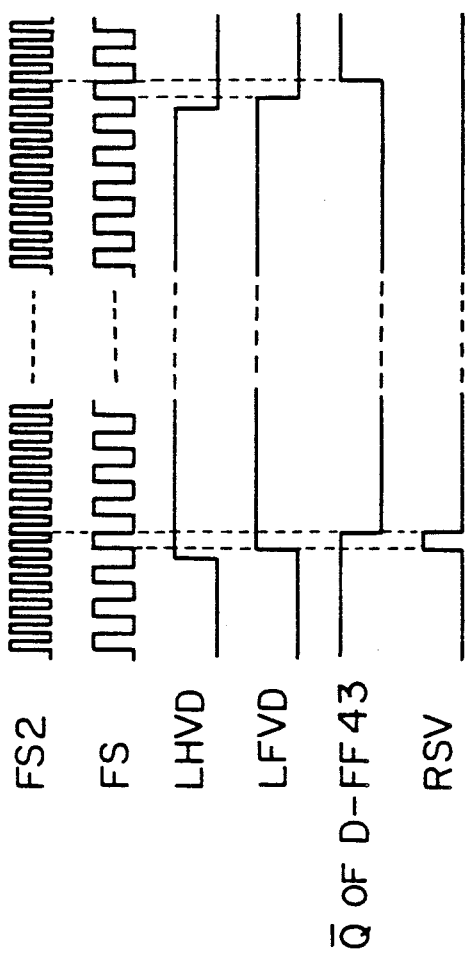

The D-FF 41 sample holds the vertical sync signal VD on the input terminal 37 by being timed to the horizontal sync signal WHD on the input terminal 36, and it produces a vertical sync signal LHVD which is in-phase with the horizontal sync signal WHD and having a pulse width equal to an integral multiple of the WHD period, as shown in FIG. 10. The D-FF 42 sample-holds the level of the vertical sync signal LHDVD by being timed to the clock FS of $f_{sc}$ which is produced by demultiplying the clock FS2 by the half-demultiplication circuit 44, and it produces a vertical sync signal LFVD which is in-phase with the clock FS and pulse width equal to an integral multiple of the FS period. The vertical sync signal LFVD has its level sample-hold by the D-FF 43 at the timing of the clock FS2. Consequently, the D-FF 43 produces on its $\overline{Q}$ terminal a pulse which is opposite in phase to the vertical sync signal LFVD and is lagged by one period $\tau$ of the clock FS2, as shown in FIG. 11. The resulting pulse and the vertical sync signal LFVD are fed to the AND gate 45, and a pulse RSV indicating the rising edge (front edge) of the vertical sync signal LFVD is formed. The pulse RSV is fed through the OR gate 46, and it works as a reset pulse RS to clear the counter 47.

Although in this embodiment the vertical sync signal VD received on the input terminal 37 has a period of 262.5H, as will be appreciated from FIG. 10, it is sample-held by the horizontal sync signal, resulting in the vertical sync signals LHVD and LFVD having periods of 262H and 263H, and eventually in the pulse RSV having the same periods alternately. The same result is reached when the vertical sync signal VD has periods of 262H and 263H alternately.

In this embodiment, as described, the counter 47 is cleared for each field by the pulse RSV which is in-phase with the horizontal sync signal at writing, and therefore each scanning line read out of the field memory 5 becomes in-phase with the scanning line of the input color video signal. The pulse RSV is also in-phase with the continuous clock FS, and therefore the field memory 5 is controlled for the reading of scanning lines of each field such that the crosstalk chrominance signal component $\Delta C$ of luminance signal Y has a constant phase relation with the color subcarrier of the reading modulation circuit 7, i.e., the chrominance signal C'. Consequently, color flicker does not occur, and the horizontal sync signal can be made continuous between the input color video signal and the readout color video signal.

Figure 12A:
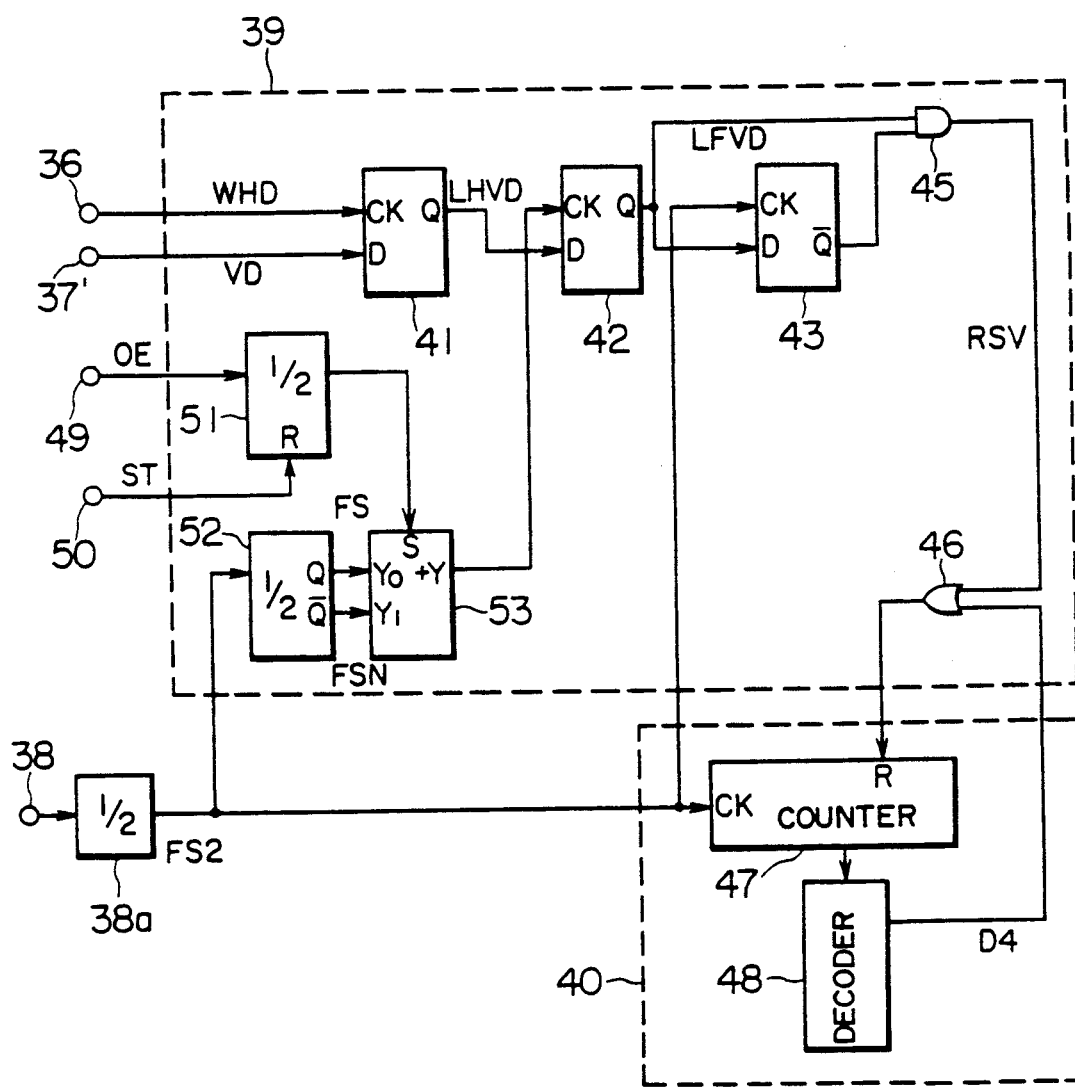
FIG. 12A is a block diagram showing specifically the read control circuit used for a further embodiment of the inventive color video signal processing method.

FIG. 12A is a block diagram showing another embodiment of the read control circuit 14 in FIG. 3. Indicated by 49 and 50 are input terminals, 51 and 52 are half-demultiplication circuit and 53 is a multiplexer. Other components identical to those of FIG. 9A are referred to by the same symbols and explanation thereof will not be repeated.

This embodiment is intended to process a moving image as well as a still image.

Figure 12B:
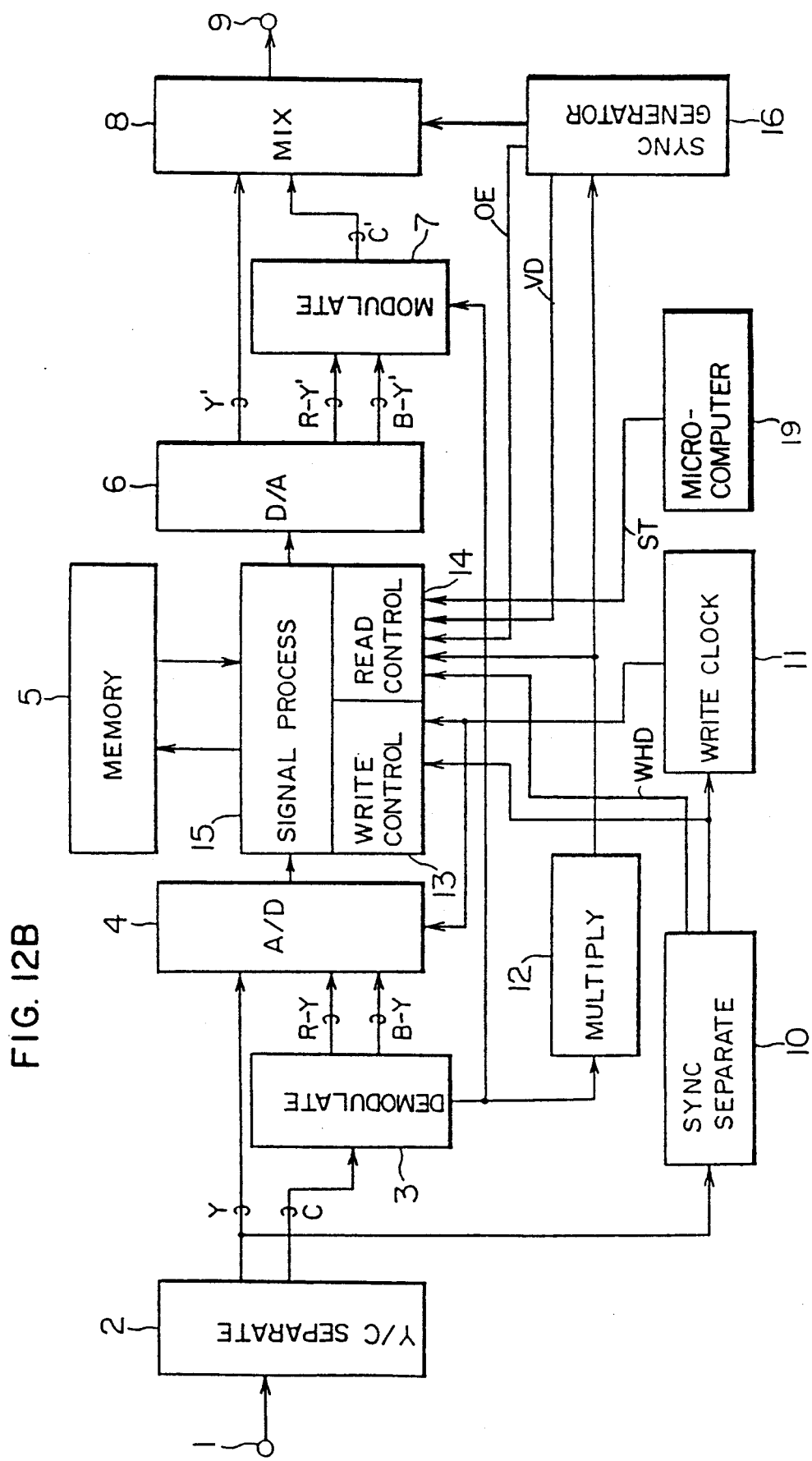
FIG. 12B is a schematic block diagram similar to FIG. 3 and showing the connections required by FIG. 12A.

In FIG. 12A, the input terminal 49 receives an odd field identification signal OE of the readout color video signal which reverses the level for each field, and the input terminal 50 receives a write control signal ST provided from microcomputer 19 the field memory 5, as seen in FIG. 12B. A field including odd-numbered scanning lines will be called an "odd field" and a field including even-numbered scanning lines will be carried an "even field". The write control signal ST is high when the field memory 5 is in write mode, and it is low when the memory 5 is in write-half mode.

Although this embodiment resembles the preceding embodiment shown in FIG. 9A in their major arrangement, it uses the half-demultiplication circuits 51 and 52 and the multiplexer 53 in place of the half-demultiplication circuit 44 in FIG. 9A, so that it can also process a moving image. The half-demultiplication circuit 51 demultiplies by two the odd field identification signal OE on the input terminal 49 to form a control signal of 4-field period, and it is kept cleared when the write signal ST is low. The half-demultiplication circuit 52 demultiplies the clock FS2 by two to produce clocks FS and FSN having the frequency $f_{sc}$ and opposite phases. The multiplexer 53 is controlled by the control signal form the half-demultiplication circuit 51 to select the clock FS or FSN when the signal level is low or high, respectively, as the clock for the D-FF 42.

In the case of still image processing, the field memory 5 is write-inhibited, with the write control signal ST being low, and the half-demultiplication circuit 51 is kept cleared and the control signal becomes low. Therefore, the multiplexer 53 selects the clock FS from the half-demultiplication circuit 52. Consequently, this embodiment operates identically to the preceding embodiment shown in FIG. 9A.

In the case of moving image processing, the field memory 5 is set invariably to write mode, and at the same time it is read out. Therefore, the write control signal ST is kept high, and the half-demultiplication circuit 51 produces a control signal of 4-field period which reverses the level at each transition from an odd to even field. Therefore, the multiplexer 53 selects the clock FS or FSN alternately for every second field.

The D-FF 42 produces, at every vertical sync signal VD, the vertical sync signal LFVD which is in-phase with the horizontal sync signal WHD and the clock from the multiplexer 53. This clock reverses and has its phase shifted by $\tau$ for every second field, causing the vertical sync signal LFVD to be shifted by $\tau$ for every second field, and eventually the pulse RSV which becomes the reset pulse for the counter 48 has the same property.

In the moving image processing, the relation of interleave is required and, based on this condition, so far as the crosstalk chrominance signal $\Delta C$ and chrominance signal C' maintain the constant phase relation as shown in FIGS. 13A–13D, color flicker does not occur. However, to meet the condition, the chrominance signal C' must have opposite phases at the starting point of odd-numbered fields, i.e., the first and third fields, and of even-numbered fields, i.e., the second and fourth fields.

Such a phase relation is readily accomplished by sample-holding the level of the vertical sync signal LHVD by the clock FS2, provided that there is no phase fluctuation in the reading clock entered through the input terminal 38 and the writing horizontal sync signal, thereby preventing color flicker.

However, when the color video signal for moving image processing has a jitter, as in a reproduced signal from a VTR, which fluctuates the phase of writing horizontal sync signal, it causes a jitter between the stable reading clock entered through the input terminal 38 and the writing horizontal sync signal WHD, and eventually a jitter between the vertical sync signal LHVD and clock FS2. For example, in FIGS. 13A–13D, the crosstalk chrominance signal component $\Delta C$ and chrominance signal C' are in-phase for the first scanning line of the first field, whereas they can have an opposite relation for the first scanning line of the second field. Such a variation in phase relation naturally results in the occurrence of color flicker. Jitter causes the field length to vary at random, and this creates color flicker accordingly.

When the embodiment shown in FIG. 9A is used to control the field memory 5, the counter 47 is cleared for each field by the pulse RSV which is synchronized to the clock FS having the same frequency $f_{sc}$ as the color subcarrier, and therefore the field memory 5 is read out in such a way that the phase relation between the crosstalk chrominance signal component ΔC and the chrominance signal C' reverses for every second field, resulting in the occurrence of color flicker also in this case.

In the embodiment shown in FIG. 12A, the pulse RSV which clears the counter 47 in moving image processing is shifted by half the period of the color subcarrier (i.e., τ) at a transition from an odd to even field. Therefore, at the beginning of an even-numbered field, the chrominance signal C' has its phase reversed relative to the one at the beginning of the immediately preceding odd-numbered field, and at the beginning of an odd-numbered field, it is in-phase with the one at the beginning of the immediately preceding even-numbered field. The same phase relation exists for the crosstalk chrominance signal ΔC which is read out of the field memory 5, and consequently the crosstalk chrominance signal ΔC and chrominance signal C' have a constant phase relation, as shown in FIGS. 13A-13D, and color flicker can be suppressed. Moreover, the horizontal sync signal is rendered phase synchronization for each field, and therefore it is possible to match the phases of the color video signal entered through the input terminal 1 and the color video signal delivered through the output terminal 9 in FIG. 3.

Figure 14A:
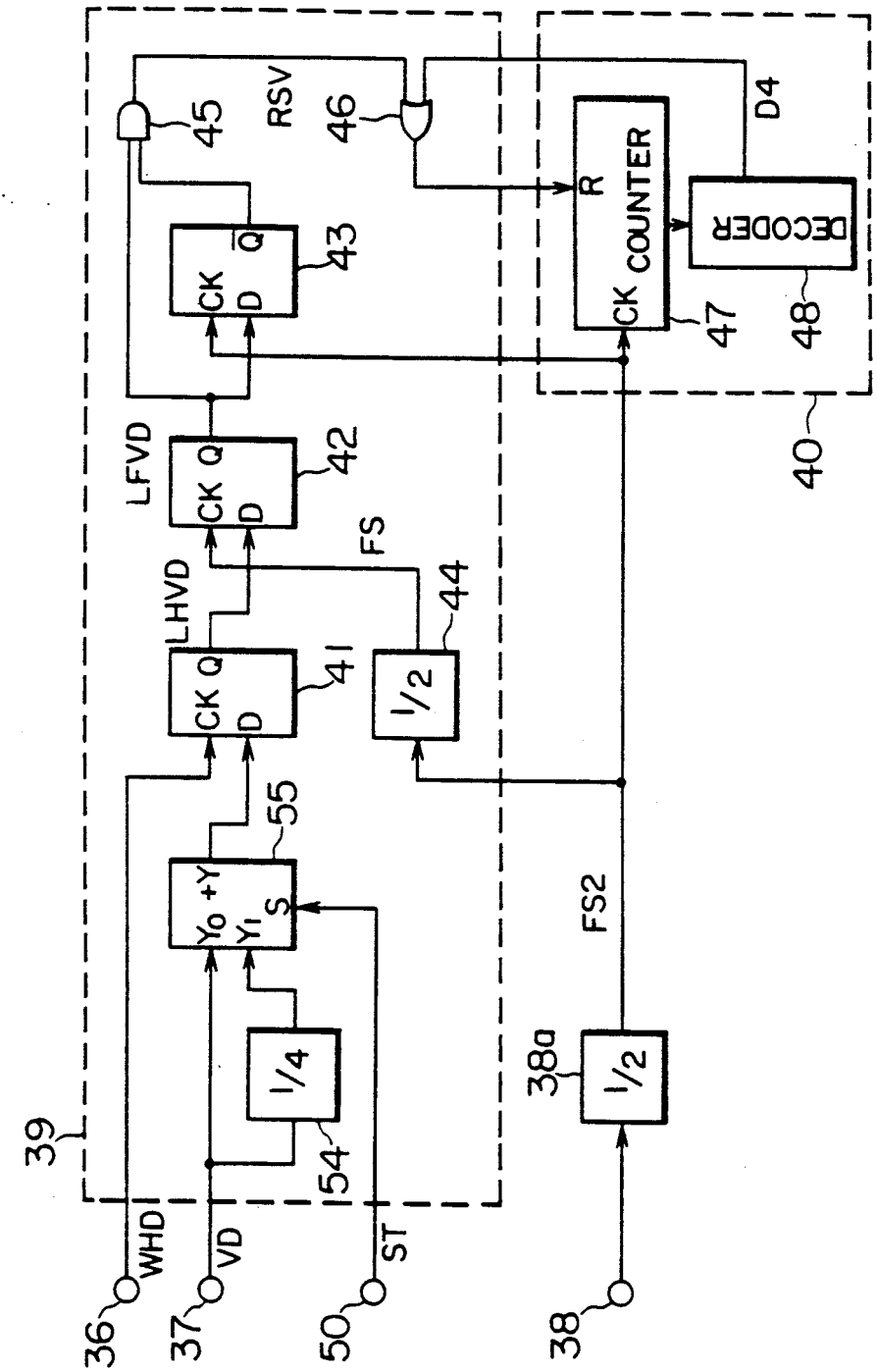
FIG. 14A is a block diagram showing specifically the read control circuit used for a further embodiment of the inventive color video signal processing method.
Figure 14B:
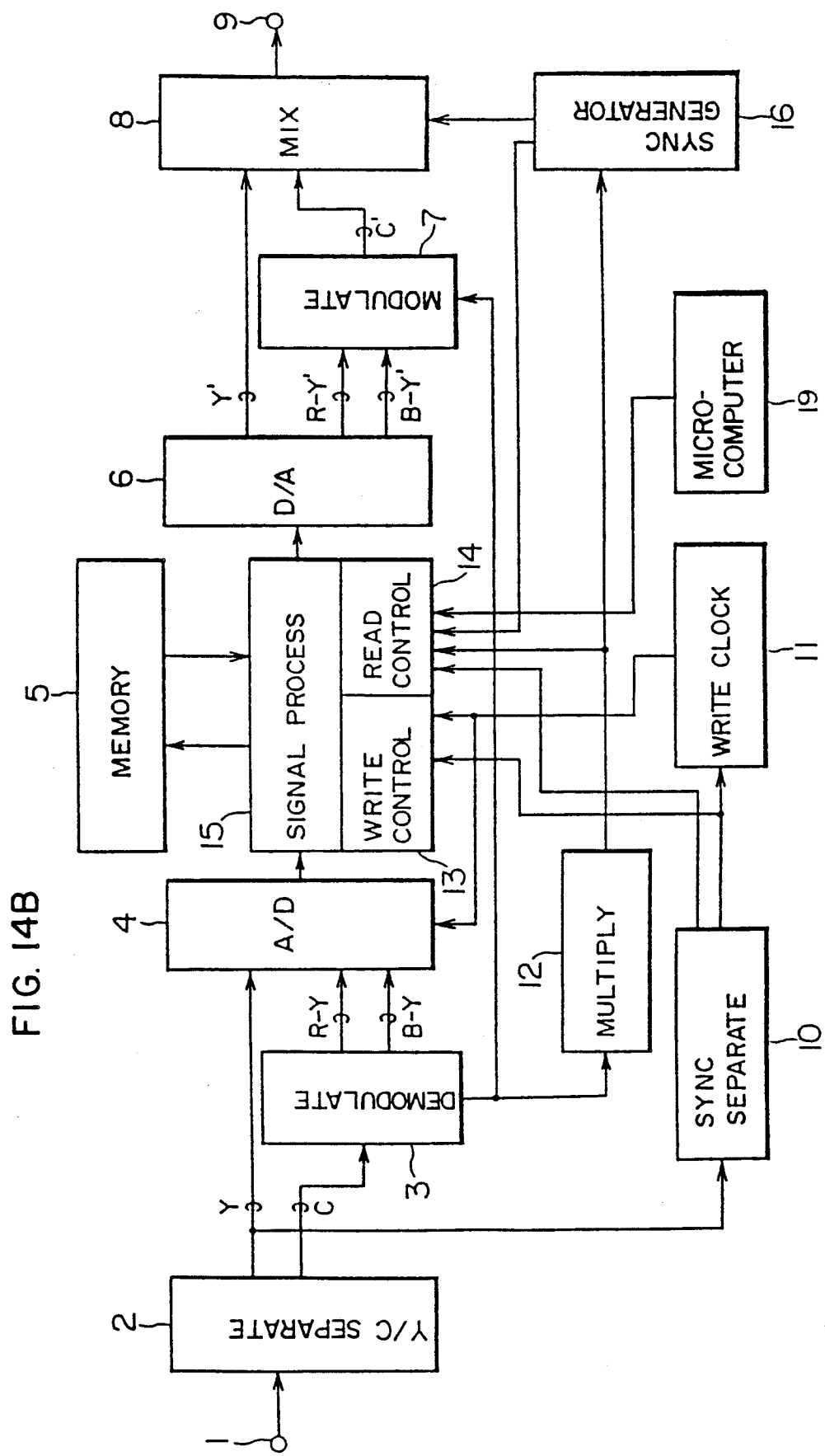
FIG. 14B is a schematic block diagram similar to FIG. 3 and showing the connections required by FIG. 14A.

FIG. 14A is a block diagram showing still another embodiment of the read control circuit 14 in FIG. 3 intended for still image processing and moving image processing. Indicated by 54 is a quarter-demultiplication circuit and 55 is a multiplexer, and other component identical to those of FIG. 12A are referred to by the same symbols. FIG. 14B shows a system similar to FIG. 3 in which the read control circuit 14 of FIG. 14A is implemented.

Whereas in the embodiment of FIG. 12A the pulse RSV is shifted by τ by reversing the clock for the D-FF 42 for every second field in the moving image process, the current embodiment is intended to have the same effect by using the quarter-demultiplied version of the vertical sync signal VD.

In FIG. 14A, a phase adjustment circuit 39 is arranged by adding a multiplexer 55 to the phase adjustment circuit 39 shown in FIG. 9A. The vertical sync signal VD from the input terminal 37 is fed to the multiplexer 55 as a direct input $Y_0$ and, at the same time, it is demultiplied by the quarter-demultiplication circuit 54 and fed to the multiplexer 55 as an input $Y_1$. The multiplexer 55 is controlled by the write control signal ST from the input terminal 50, and it selects the vertical sync signal VD or the output signal of the quarter-demultiplication circuit 54 when the control signal is low or high, respectively, and supplies the selected signal as data D to the D-FF 41.

In still image processing, the write control signal ST goes low, and the vertical sync signal VD is supplied to the D-FF 41 by way of the multiplexer 55. Consequently, similar control to the embodiment of FIG. 9A takes place.

In moving image processing, the write control signal ST goes high, and the output signal of the quarter-demultiplication circuit 54 is supplied to the D-FF 41 by way of the multiplexer 55. This output signal has a 4-field period, and accordingly the AND gate 45 provides a pulse RSV which has a 4-field period and is in-phase with the writing horizontal sync signal WHD and the output clock FS (i.e., color subcarrier). The counter 47 is cleared by this pulse RSV.

This embodiment performs control so that the crosstalk chrominance signal component ΔC and chrominance signal C' have a constant phase relation for every fourth field (e.g., at each first field in FIGS. 13A–13D) thereby to remove color flicker, and it is capable of matching the phase of horizontal sync signals between the color video signal entered through the input terminal 1 and the color video signal delivered through the output terminal 9.

According to this invention, as described above, the crosstalk chrominance signal component in the luminance signal read out of the memory and the chrominance signal are made to have a constant phase relation, and color flicker attributable to the color saturation and variation of hue can be eliminated, whereby the picture quality can be improved significantly.

Figure 15:
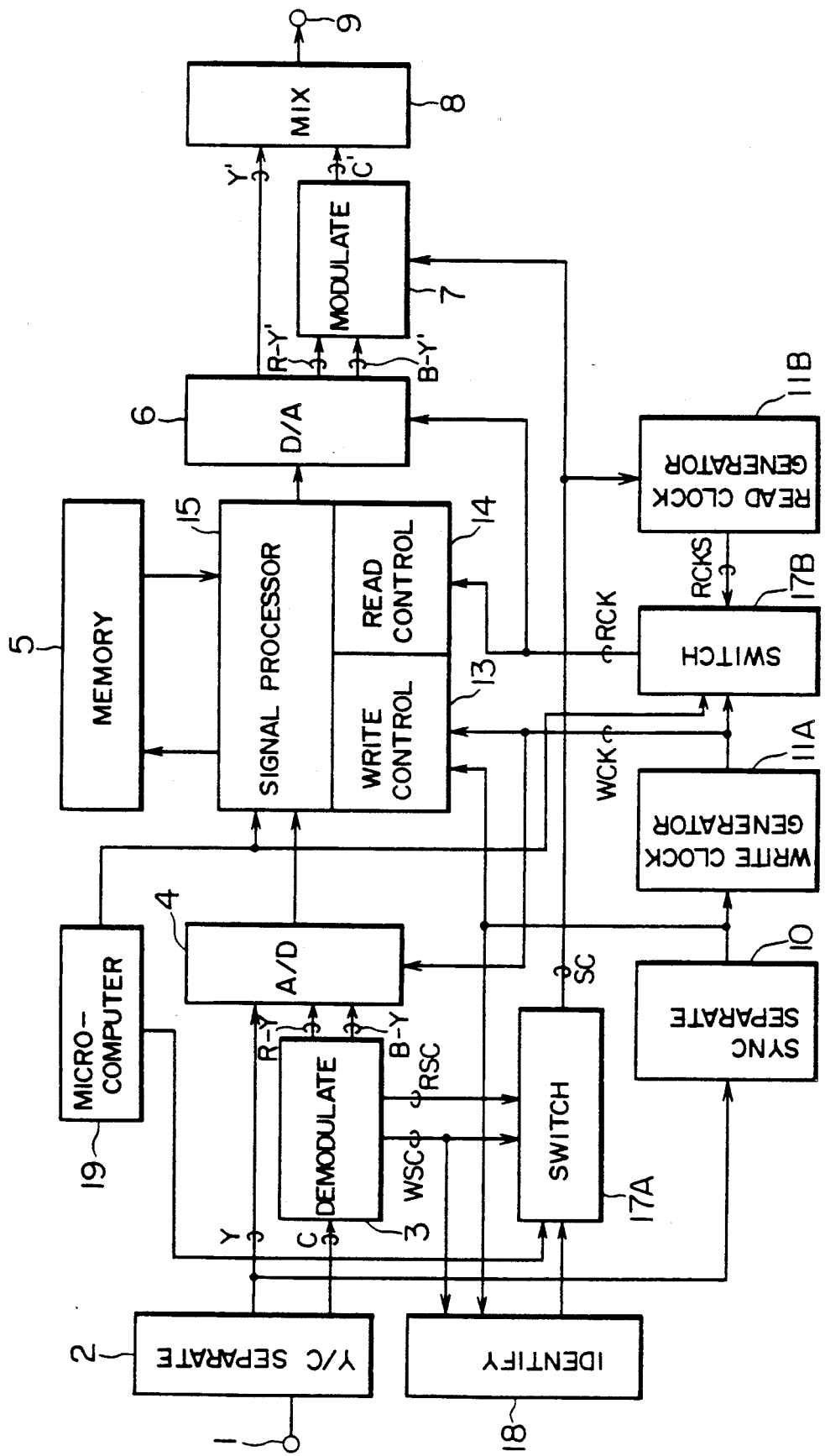
FIG. 15 is a block diagram showing another embodiment of the apparatus which embodies the inventive color video signal processing method.

FIG. 15 shows another embodiment of the inventive color video signal processor. This embodiment is applicable to a composite color video signal received on the input terminal 1 which does not conform to the standard television system, and also applicable to the color video signal processing in which the write clock and read clock need not be synchronous. In FIG. 15, components identical to those in FIG. 3 are referred to by the same numerals. Further provided for the ability of signal processing for a non-synchronous system and non-standard system are a selector for read clocks, an identifier for the standard/non-standard modes of input signal, and a selector for color subcarriers used for producing a chrominance signal.

The embodiment of FIG. 15 will be described with reference to the drawing. Indicated by 1 is an input terminal for a video signal, 2 is a Y/C separation circuit, 3 is a demodulation circuit, 4 is an A/D conversion circuit, 15 is a signal processing circuit, 5 is a memory, 6 is a D/A conversion circuit, 7 is a modulation circuit, 8 is a mixing circuit, 9 is an output terminal, 7A is a switching circuit, 10 is a sync separation circuit, 11A is a write clock generation circuit, 11B is a read clock generation circuit, 17B is a switching circuit, 13 is a write control circuit, 14 is a read control circuit, 18 is an identification circuit, and 19 is a microcomputer.

In the figure, a composite color video signal received on the input terminal 1 is fed to the Y/C separation circuit 2, by which the signal is separated into a luminance signal Y and a chrominance signal C. The chrominance signal C is fed to the demodulation circuit 3, by which the signal is demodulated into two color difference signals R-Y and B-Y. The luminance signal Y is fed to the sync separation circuit 10, by which the sync signal is separated, and the write clock generation circuit 11A multiplies the horizontal sync signal to produce a write clock WCK. The write clock WCK is supplied as a sampling pulse to the A/D converter 4, which digitizes the luminance signal Y provided by the Y/C separation circuit 2 and the color difference signals R-Y and B-Y provided by the demodulation circuit 3, and the resulting signals are delivered to the signal processing circuit 15. The digital signals are processed by the signal processing circuit 15 and then stored sequentially in the memory 5 under write control of the write control circuit 13 which is supplied with the sync signal from the sync separation circuit 10 and the write clock WCK provided by the write clock generation circuit 11A.

Digital signals are read out of the memory 5 sequentially under read control of the read control circuit 14 which is supplied with the read clock RCK provided by the switching circuit 17B. After being processed by the signal processing circuit 15, the signals are transformed into analog signals by the D/A converter 6, which produces a luminance signal Y' and two color difference signals R-Y' and B-Y'. The color difference signals R-Y' and B-Y' are fed to the modulation circuit 7, by which the signals are modulated with a color subcarrier SC from the switching circuit 17A to produce a chrominance signal C'. The chrominance signal C' is mixed by the mixing circuit 8 with the luminance signal Y' from the D/A converter 6, and a resulting color video signal is delivered through the output terminal 9.

The microcomputer 19 controls the signal processing circuit 15 and switching circuits 17A and 17B in each mode which will be described later. The signal processing circuit 15 processes the digital signal from the A/D converter 4 and the digital signal read out of the memory 5 in accordance with the specified mode. The demodulation circuit 3 produces a color subcarrier WSC which is synchronized to the burst signal of the entered chrominance signal C and a color subcarrier RSC having a crystal-based stable phase. The switching circuit 17A selects one of the color subcarriers WSC and RSC as a color subcarrier SC depending on the mode specification by the microcomputer 19 and the identification result provided by the identification circuit 18. The color subcarrier SC is fed to the clock generation circuit 11B, by which the SC is multiplied to produce a read clock RCKS. The switching circuit 17B selects one of the read clock RCKS and the write clock WCK from the clock generation circuit 11A as a read clock RCK in accordance with the mode specification by the microcomputer 19. The identification circuit 18 discriminates the frequency relation between color subcarrier WSC, which is in-phase with the burst signal of the input color video signal from the demodulation circuit 3, and the horizontal sync signal from the sync separation circuit 10 thereby to identify whether the video signal entered through the input terminal 1 is a video signal, such as a broadcast signal, which complies with the standard system (will be termed "standard signal") or it is a video signal, such as a reproduced signal from a recording/playback unit, which is out of standard (will be termed "non-standard signal"). In the case of NTSC system, for example, the color subcarrier and horizontal sync signal have their frequencies $f_{sc}$ and $f_H$, respectively, related as follows.

$$F_{sc} = \frac{455}{2} \times F_H \quad (1)$$

The identification circuit 18 uses the above relation to discriminate video signals to be a standard signal which meets the relation or a non-standard signal which does not meet the relation.

In this embodiment, as a result of control for the switching circuit 17B depending on the mode command from the microcomputer 19, there are two cases for the read clock RCK of it being identical to the write clock WCK and it being the read clock from the read clock generation circuit 11B. The former case will be called "synchronous" read/write for the memory 5, the latter case being "asynchronous".

The following first explains the case of synchronous read/write for the memory 5, which is implemented in the noise suppression process and the like.

In response to the mode command from the microcomputer 19, the switching circuit 11 selects only the color subcarrier WSC as a color subcarrier SC. The switching circuit 17B selects the write clock WCK as a read clock RCK.

Since the memory 5 is stored and read out by the same clock, there is no displacement on the time axis, i.e., signal extension/contraction, between the digital signal sent from the A/D converter 4 to the signal processing circuit 15 and the digital signal sent from the signal processing circuit 15 to the D/A converter 6. The memory 5 is a field memory 5, providing a digital signal which is delayed by one field, therefore it constitutes a noise reducer of a field cycle type in unison with the signal processing circuit 15, thereby implementing the noise suppression process.

Next, the case of asynchronous read/write for the memory 5 will be described. This mode is used for various signal processings including the still image process, zooming and associated variable magnification process, mirror inverse process, mosaic process and associated variable size process, and bit drop process (in other words, solarization process in which lower bits are removed to present a display in oil painting fashion) and associated variable tone level process. These signal processings do not need to have the synchronism between the digital signal fed from the A/D converter 4 to the signal processing circuit 15 and the signal read out of the memory 5, and therefore the memory 5 does not need to be synchronized for reading and writing. This scheme is advantageous particularly in dealing with a non-standard signal reproduced on a home VTR, which often includes jitter, and the asynchronous operation enables the memory 5 to provide a stable (with the jitter being removed) video signal.

The above-mentioned modes are specified by the microcomputer 19, and the switching circuit 17B selects the read clock RCKS from the read clock generation circuit 11B.

The following Table 1 and Table 2 list the selected outputs from the switching circuits 17A and 17B.

TABLE 1

| Switching circuit 17A | | |
|---|---|---|
| | Standard signal | Non-standard signal |
| | Color subcarrier SC | |
| Synchronous mode | WSC | WSC |
| Asynchronous mode | WSC | RSC |

TABLE 2

| Switching circuit 17B | |
|---|---|
| | Read clock RCK |
| Synchronous mode | WCK |
| Asynchronous mode | RCKS |

Assuming the video signal in concern here to be of the NTSC system, the horizontal signal and color subcarrier have the frequency relation as has been expressed in equation (1). The write clock generation circuit 11A multiples by $$4 \times \frac{455}{2}$$

the horizontal sync signal from the sync separation circuit 10 to produce the write clock WCK, and the read clock generation circuit 11B multiplies by four the color subcarrier SC to produce the read clock RCKS.

First, the case of asynchronous reading/writing for the memory 5 and input of standard color video signal on the input terminal 1 will be described.

In this case, the identification circuit 18 discriminates the frequency relation between the color subcarrier WSC from the demodulation circuit 3 and the horizontal sync signal from the sync separation circuit 10. These signals meet the equation (1), and the input color video signal is identified to be a standard signal. The microcomputer 19 issues a mode command to control the switching circuit 17A to select the color subcarrier WSC as a color subcarrier SC.

Therefore, the color subcarrier SC and the horizontal sync signal from the sync separation circuit 19 have the frequency relation of equation (1), signifying that the write clock WCK and read clock RCK are phase-locked at the same frequency, and the operation is identical to the case of synchronous read/write of the memory 5. The color subcarrier CS supplied to the modulation circuit 7 is phase-locked to the color subcarrier of the chrominance signal C, and therefore the chrominance signal of the color video signal delivered to the output terminal 9 does not include a color flicker component, and accordingly the degradation of picture quality due to the crosstalk of the chrominance signal is retarded.

Next, the case of the color video signal received on the input terminal 1 being a non-standard signal will be described. For example, a color video signal reproduced on a home VTR includes a skew distortion and jitter, and its S/N ratio is deteriorated. On this account, the color subcarrier WSC has its phase varied slightly. Therefore, when this color subcarrier WSC is used for the color subcarrier of the chrominance signal C', the chrominance signal C' has its phase fluctuated, resulting in a deteriorated picture quality.

The identification circuit 18 discriminates the frequency relation between the color subcarrier WSC from the demodulation circuit 3 and the horizontal sync signal from the sync separation circuit 10, revealing that they do not meet the above equation (1) due to the swing of phase of the color subcarrier WSC, and accordingly it identifies the input color video signal to be a non-standard signal. In response to this discrimination result and the mode command from the microcomputer 19, the switching circuit 17A selects the stable color subcarrier RSC from the demodulation circuit 3 as a color subcarrier SC.

Consequently, the switching circuit 17B provides a stable read clock RCK and the luminance signal Y', color difference signals R-Y' and B-Y' read out of the memory 5 is a stable signal which does not include a skew distortion and jitter. These color difference signals R-Y' and B-Y' are used to modulate the stable color subcarrier SC in the modulation circuit 7, and a stable chrominance signal C' is produced.

In the case of a non-standard signal, the write clock WCK and read clock are not synchronous, and therefore the phase relation between the chrominance signal CY' in the luminance signal Y' and the chrominance signal C' is not constant in a strict sence. However, as described above, as a result of modulation of the stable color subcarrier SC, the stable chrominance signal C' is produced, and the picture quality is improved.

In this embodiment, as described above, even if the luminance signal includes a residual chrominance signal, the deterioration of picture quality which would be caused by it can be prevented.

Figure 16:
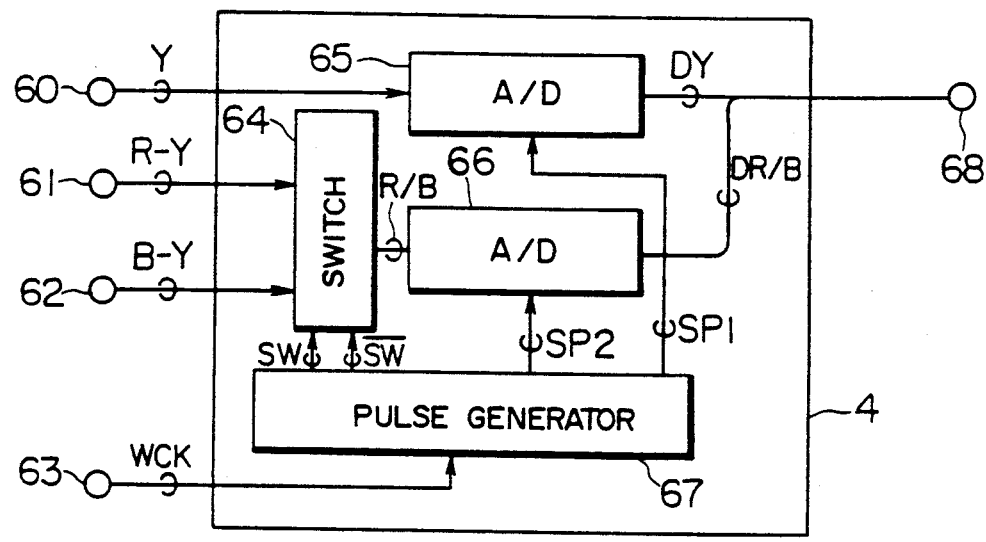
FIG. 16 is a block diagram showing a specific embodiment of the A/D conversion circuit in FIG. 15.
Figure 17:
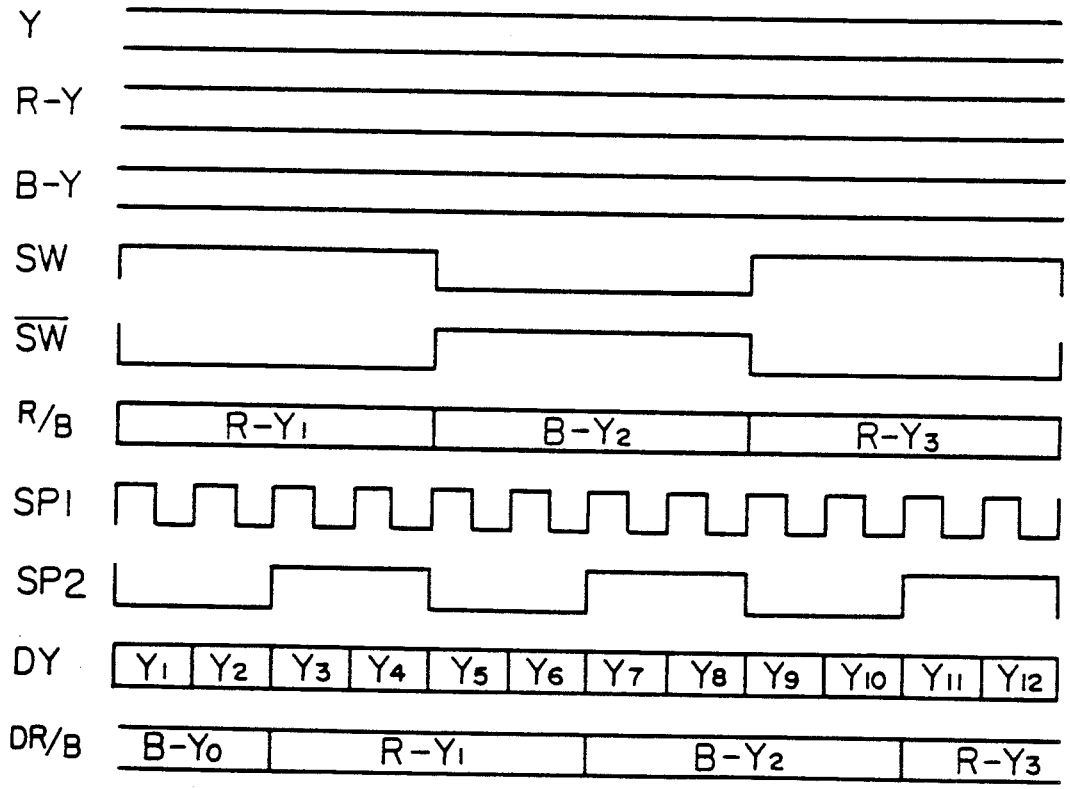
FIG. 17 is a diagram showing, as an example, the timing relation between the signals at various parts of FIG. 16.

FIG. 16 is a block diagram showing an embodiment of the A/D conversion circuit 4 in FIG. 15. The circuit includes input terminals 60-63, a switching circuit 64, A/D converters 65 and 66, a pulse generation circuit 67, and an output terminal 68. FIG. 17 is a diagram showing the timing relation among signals in various parts of FIG. 16. The signals corresponding to each other in both FIGS. 16 and 17 are given the same symbols.

In FIGS. 16 and 17, the input terminal 63 receives the write clock WCK of frequency $4f_{sc}$ as described above, and the pulse generation circuit 67 produces, from this write clock WCK, a switching control signals SW and $\overline{SW}$, a sampling pulse SP1 for the luminance signal Y, and a sampling pulse SP2 for the color difference signals R-y and B-Y. It is assumed here as an example that the sampling pulse SP1 has a frequency of $4f_{sc}$ and the sampling pulse SP2 for the color difference signals R-Y and B-Y, which are sufficiently narrow in frequency band relative to the luminance signal Y, has a frequency of $f_{sc}/2$. Owing to the low frequency of the sampling pulse SP2, a slow inexpensive A/D converter can be used for the color difference signals R-Y and B-Y.

The luminance signal Y received on the input terminal 60 is fed to the A/D converter 65, which uses the sampling pulse SP1 to transform the signal into a digital luminance signal DY. The color difference signals R-Y and B-Y received on the input terminal 61 and 62 are fed to the switch circuit 64, by which the signals are selected alternately in response to the switching control signals SW and $\overline{SW}$ thereby to produce a time-multiplexed (point sequential) color difference signal R/B. The switching control signal SW is a pulse signal having a period eight times that of the write clock WCK (i.e., the sampling pulse SP1) with a 50% duty cycle, and the switching control signal $\overline{SW}$ is an inverted version of the switching control signal SW. Based on these signals the switching circuit 64 selects the color difference signals R-Y and B-Y alternately in every fourth period of the write clock WCK. The time-multiplexed color difference signal R/B is fed to the A/D converter 66, which uses the sampling pulse SP2 with a period four times that of the write clock WCK (i.e., a frequency of $f_{sc}$) to transform the signal into a digital time-multiplexed color difference signal DR/B. As a result, the color difference signals R-Y and B-Y are digitized each using a sampling pulse with a $f_{cs}/2$ frequency.

The digital luminance signal DY and digital time-multiplexed color difference signal DR/B are delivered separately or by being merged through the output terminal 68.

In this embodiment, the color difference signals R-Y and B-Y are digitized on the basis of time-slice multiplexing, and therefore an A/D converter can be shared by these signals and it can be a slow inexpensive one.

Figure 18:
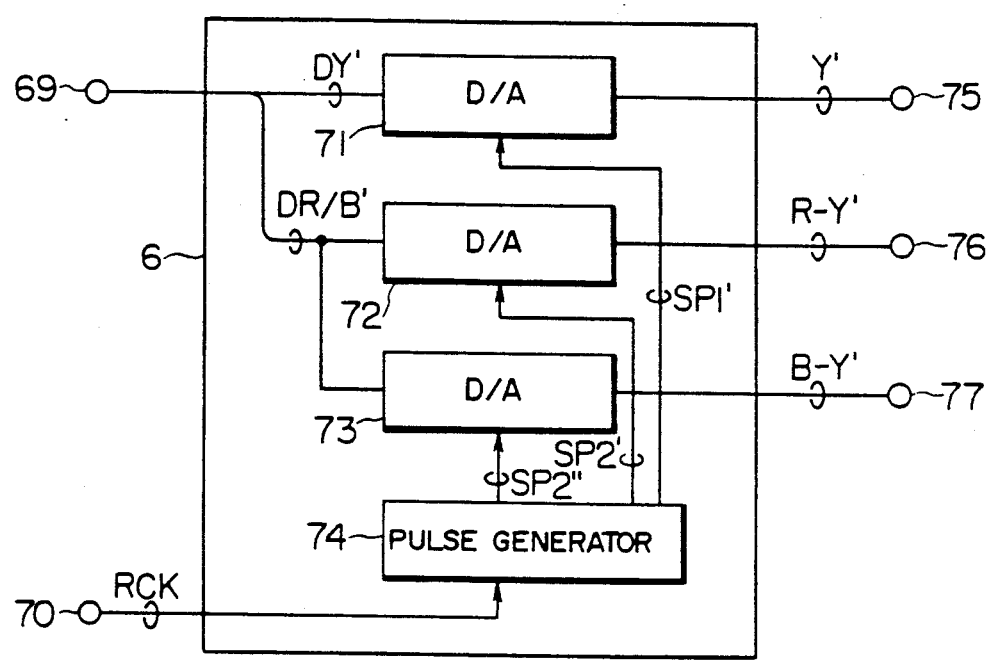
FIG. 18 is a block diagram showing a specific embodiment of the D/A conversion circuit in FIG. 15.

FIG. 18 is a block diagram showing an embodiment of the D/A conversion circuit 6 in FIG. 15, which is used in pair with the A/D conversion circuit 4 shown in FIG. 16. Indicated by 69 and 70 are input terminals, 71-73 are D/A converters, 74 is a pulse generation circuit, and 75-77 are output terminals.

Figure 19:
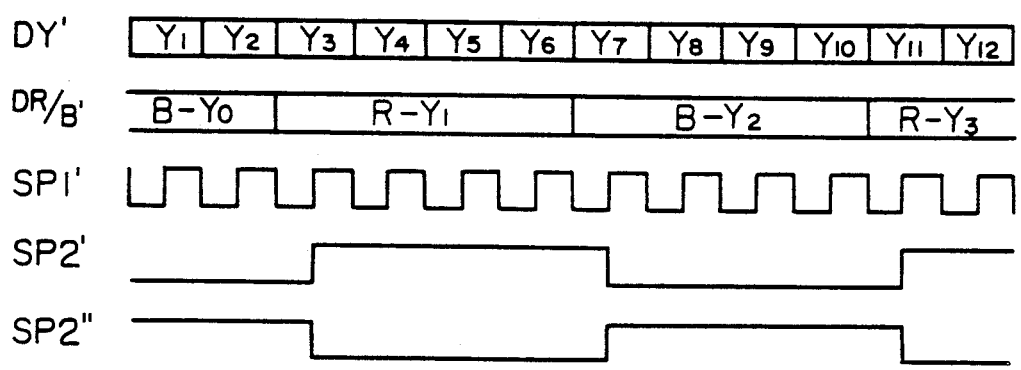
FIG. 19 is a diagram showing, as an example, the timing relation between the signals at various parts of FIG. 18.

FIG. 19 is a diagram showing the timing relation among signals in various parts of FIG. 18 of the case where the signal processing circuit 15 does not have processing for the signal rearrangement and time-axis conversion. The signals corresponding to each other in FIGS. 18 and 19 are given the same symbols.

In FIGS. 18 and 19, the input terminal 70 receives the read clock RCK, and from it the pulse generation circuit 74 produces sampling pulses SP1', SP2' and SP2". The sampling pulse SP1' has a frequency of $4f_{sc}$, while the sampling pulse SP2' and SP2" have a frequency of $f_{sc}/2$ and polarities opposite to each other.

The digital luminance signal DY' received on the input terminal 69 is fed to the D/A converter 31, which uses the sampling pulse SP1' to transform the signal into an analog luminance signal Y'. The digital time-multiplexed color difference signal DR/B' received on the input terminal 69 is fed to the D/A converter 72, which uses the sampling pulse SP2' to sample digital color difference signals $B-Y_1$, $R-Y_3$, and so on and transforms the signals into an analog color difference signal R-Y'. Similarly, the D/A converter 73 uses the sampling pulse SP2" to sample digital color difference signals $B-Y_0$, $B-Y_2$, and so on in the digital time-multiplexed color difference signal DR/B', and transforms the signals into an analog color difference signal B-Y'. These luminance signal Y' and color difference signals R-Y' and B-Y' are delivered through the output terminals 75, 76 and 77, respectively.

As described, the A/D conversion circuit 4 shown in FIG. 16 makes the color difference signals R-Y and B-Y to be point-sequential, and the color difference signals R-Y and B-Y are sampled alternately by the sampling pulse SP2 for digitization. In the D/A conversion circuit 6 shown in FIG. 18, the D/A converter 72 fetches the digital color difference signals $R-Y_1$, $R-Y_3$ and so on in the digital time-multiplexed color difference signal DR/B' in response to the sampling pulse SP2' thereby to converts the signals into a color difference signal R-Y', and the D/A converter 73 fetches the digital color difference signals $B-Y_0$, $B-Y_2$ and so on in response to the sampling pulse SP2" thereby to convert the signals into a color difference signal B-Y'. Each digital color difference signal is sampled in the same digital time-multiplex color difference signal DR/B' at the respective sampling pulses SP2' and SP2" in opposite phases, and therefore the resulting color difference signals R-Y' and B-Y' do not create a time shift and accordingly do not causes a color shift in the image.

Figure 20:
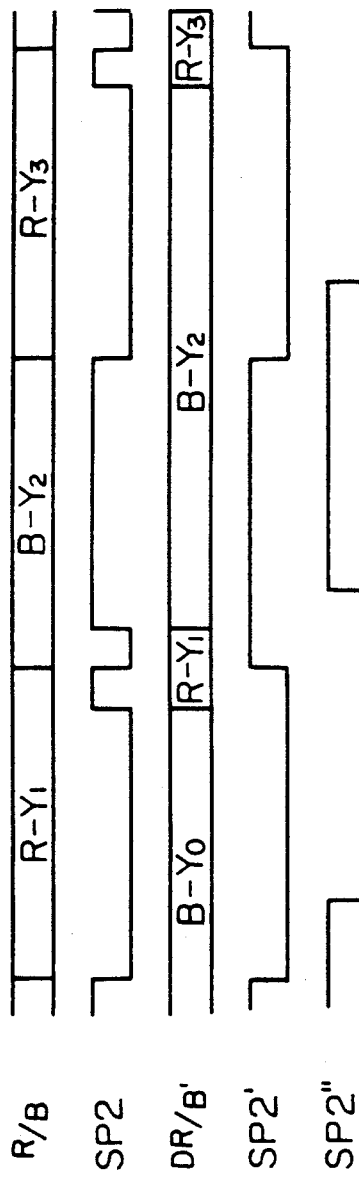
FIG. 20 is a diagram showing another example the timing relation between the signals of FIG. 18.

FIG. 20 is a timing chart showing the operation of the A/D converter 4 shown in FIG. 16 and the D/A converter 6 shown in FIG. 18 of the case where the A/D converter 4 is operable as fast as the A/D converter 65.

In FIGS. 16 and 20, the pulse generation circuit 67 produces, from the write clock WCK entered through the input terminal 63, a sampling pulse SP2 which samples the latter section of the color difference signal R-Y and the former section of the color difference signal R-Y in the time-multiplexed color difference signal R/B. The interval of sampling points for a color difference signal R-Y and following color difference signal B-Y is set equal to one period of the write clock WCK. Consequently, sampled color difference signals R-Y and B-Y have the content of information at near time points. In FIGS. 16 and 20, the D/A conversion circuit 6 is designed to produce the sampling pulse SP2' so that the D/A converter 72 fetches the color difference signal R-Y of the digital time-multiplexed color difference signal DB/B', and to produce the sampling pulse SP2" so that the D/A converter 73 fetches the color difference signal B-Y. In this case, because of a long period of the color difference signal B-Y in the digital time-multiplexed color difference signal DR/B', the timing of fetching the color difference signal B-Y can be set in a wide range. However, since the color difference signals R-Y and B-Y are sampled for digitization at almost the same timing by the A/D conversion circuit 4, it is desirable to make as small time difference between the color difference signals R-Y' and B-Y' as possible by timing the fetching of D/A converters 72 and 73 as near as possible. On this account, the fetching timing difference is set to the minimum which is one period of the read clock RCK.

In consequence, the time shift attributable to the time-slice multiplexing of the color difference signals R-Y and B-Y, and accordingly, a resulting color shift in picture quality can be prevented.

Next, the operation of the D/A conversion circuit 6 shown in FIG. 18 of the case of mosaic processing in the embodiment of FIG. 15 will be described. Here, the side length of mosaic is set to $2/f_{sc}$, i.e., a length eight times the period of the sampling pulse SP1'.

Figure 21:
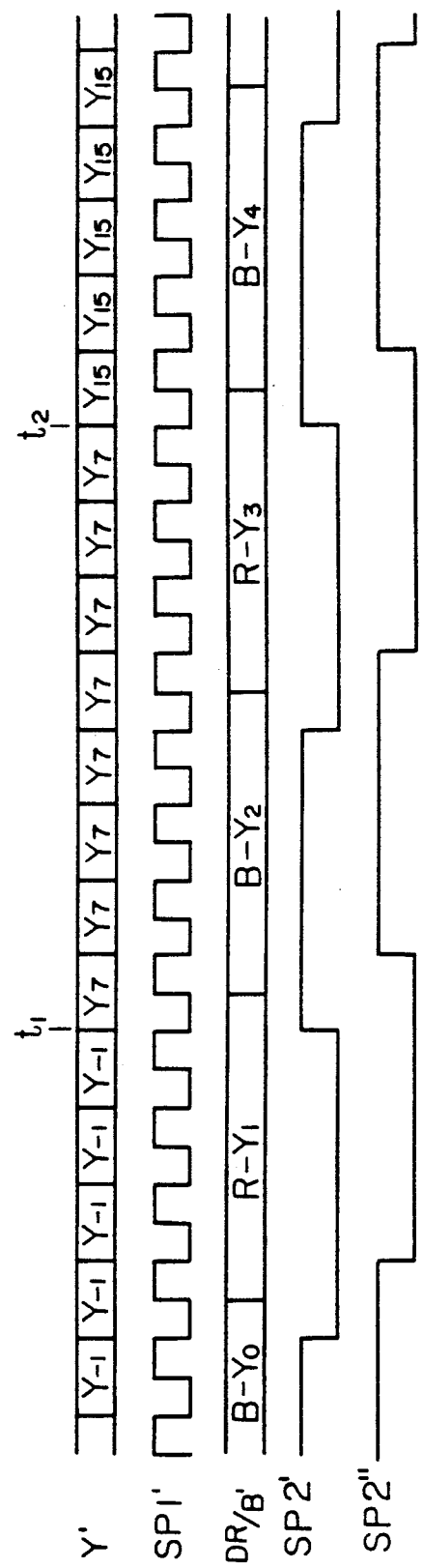
FIG. 21 is a diagram showing the timing relation between the signals of various parts in FIG. 18 in the mosaic process.

As shown in FIG. 21, the digital luminance signal DY' entered to the D/A converter 71 possesses the same content of information during a period equal to eight periods of sampling pulse SP1' as a result of process by the signal processing circuit 15, etc. In the next 8-period term, the signal DY' possesses the content of information at the sampling point which is shifted by eight period from the previous term.

In mosaic processing, the luminance signal Y and color difference signals R-Y and B-Y need to be sampled for digitization at the same timing within a mosaic. However, it is not possible for the color difference signals R-Y and B-Y to be sampled for digitization at the same timing, since they are time-multiplexed by the A/D conversion circuit 4 shown in FIG. 18.

On the other hand, even if the color difference signals R-Y and B-Y are not sampled as mentioned above, it is acceptable if there is no color change within a mosaic. With the fetching period of the D/A converters 72 and 73 being made constant as shown in FIG. 19, the color difference signals R-Y and B-Y have their fetch timings deviated significantly, resulting in a color change within a mosaic.

Therefore, as shown in FIG. 21, the mosaic process is conducted so that the boundary of the color difference signal R-Y and the next color difference signal B-Y in the digital time-multiplexed color difference signal DR/B' comes as close to the boundaries $t_1$, $t_2$ and so on of adjoining mosaic as possible, and the fetching pulses SP2' and SP2" are formed so that the D/A converter 32 fetches the latter section of the color difference signal R-Y in the digital time-multiplexed signal DR/B' and the D/A converter 73 fetches the former section of the color difference signal B-Y and that their fetch timings have the minimum time difference which is one period of the read clock RCK. Consequently, the content of information is invariable for the color difference signals R-Y' and B-Y', and color change does not occur.

Mode specification for the foregoing various signal processings, such as still image processing, is implemented by the microcomputer 19 in FIG. 15. Conventionally, in general, a signal line is alloted to each mode signal. Therefore, the number of signal lines increases as the number of modes increases, and this imposes a practical problem of increased number of pins in integrating such circuits as those incorporated in the signal processing circuit, for example, which introduce mode signals. The following describes the inventive mode signal introduction circuit that overcomes the above-mentioned problem.

Figure 22:
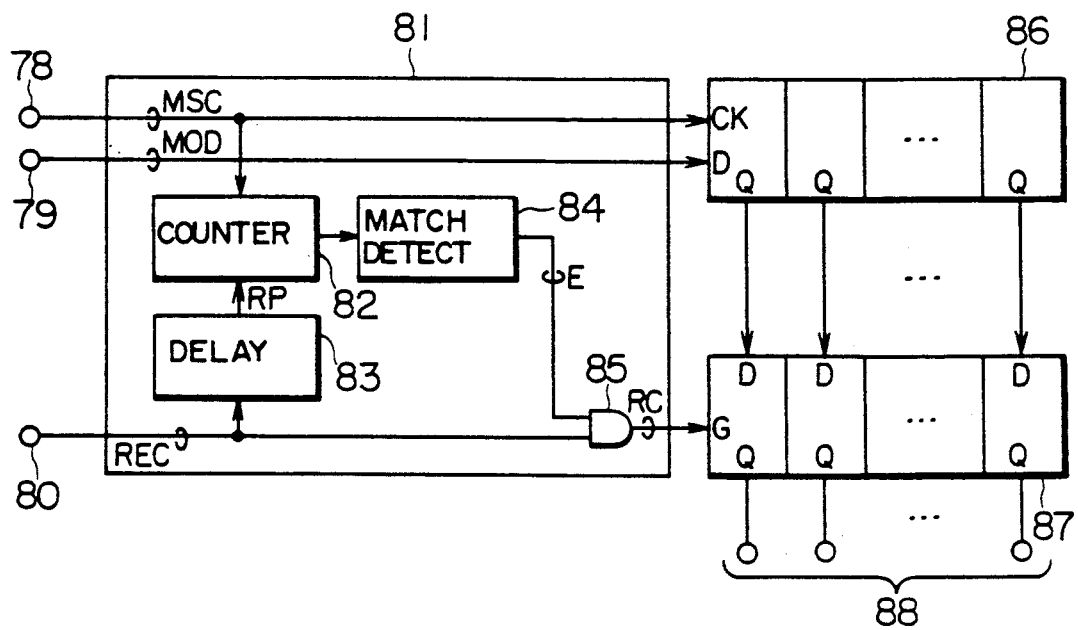
FIG. 22 is a block diagram showing a specific embodiment of the mode signal introduction circuit used in the signal processing circuit and other circuits in FIG. 15.

FIG. 22 is a block diagram showing an embodiment of the mode signal introduction circuit, in which indicated by 78-80 are input terminals, 81 is a mode introduction protection circuit, 82 is a counting circuit, 83 is a delay circuit, 84 is a matching detection circuit, 85 is an AND gate, 86 is a shift register, 87 is a latch circuit, and 88 is an output terminal.

Figure 23:
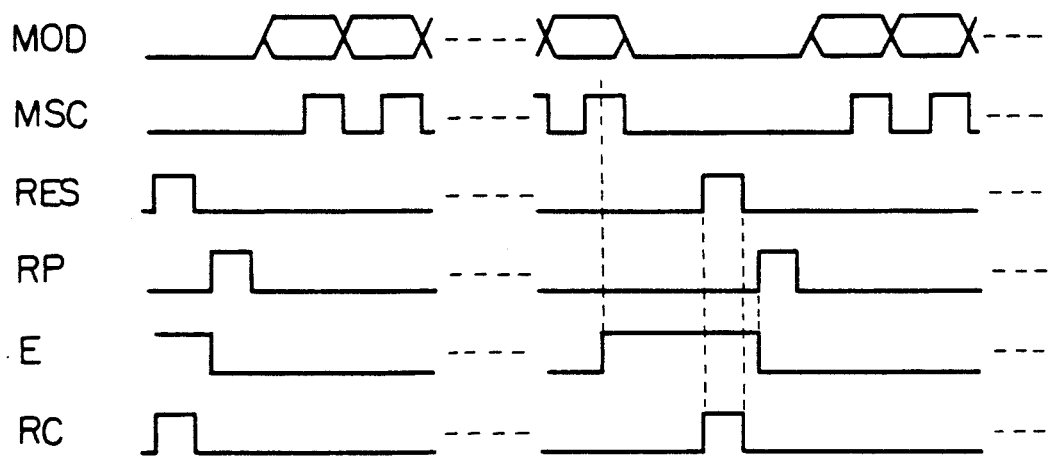
FIG. 23 is a timing chart showing the operation of the circuit shown in FIG. 22.

The microcomputer 19 provides, at the timings shown in FIG. 23, a serial mode signal MOD comprising a number of bits in correspondence to the number of available modes, a serial clock MSC for introducing the mode signal MOD, and a synchronizing signal RES indicative of the beginning and end of the mode signal MOD.

In FIGS. 22 and 23, when the synchronizing signal RES is entered to the input terminal 80, it is fed to the AND gate 45 and, at the same time, it is delayed by the delay circuit 83 so that a reset pulse RP is produced. The counting circuit 82 is cleared by receiving the reset pulse RP on its reset terminal. The delay circuit 83 has its delay time set such that the timing of reset is before the commencement of supply of the mode signal MOD to the input terminal 78.

After that, the clock MSC is entered successively through the input terminal 78, and at each clock MSC, the mode signal MOD on the input terminal 79 is introduced bit by bit to the shift register 86. The shift register 86 has stages more in number than bits of the mode signal MOD, and the mode signal MOD is entered sequentially from the highest bit position.

The counting circuit 82 counts the incoming clock signal MSC and delivers the count value to the match detection circuit 84. The match detection circuit 84 has a setting of a reference value which is equal to the number of bits of the mode signal MOD, and it produces a high-active match signal E when the count value of the counting circuit 82 coincides with the reference value, i.e., when the mode signal MOD has been entered. At this moment, all bits of the mode signal MOD are set in the shift register 86.

After that, since the clock MSC is absent, the match circuit 84 outputs the high-active match signal E continuously. When the next synchronizing signal RES is entered through the input terminal 80, the AND gate, which is enabled by the match signal E, passes the signal RES to the enable control terminal G of the latch circuit 87 as a latch pulse RC. Consequently, the mode signal MOD which has been introduced to the shift register 86 is latched by the latch circuit 87, which delivers the signal through its output terminal 88. The input synchronizing signal RES is delayed by the delay circuit 83 to form a reset pulse RP, by which the counting circuit 82 is cleared and the output E of the match detection circuit goes low. Then, the AND gate 85 is disabled. In this manner, the mode signal MOD is introduced correctly.

According to this embodiment, for an increased number of modes, the number of bits of the mode signal MOD is increased and the reference value set in the match circuit 84 is revised accordingly. Signal lines from the microcomputer 19 to the mode signal introduction circuit are as little as three, for the mode signal MOD, clock MSC and synchronizing signal RES, irrespective of the number of modes available. In addition, for the mode signal introduction circuit configured in an integrated circuit, it does not need to have an increased number of pins.

The mode signal is introduced in the vertical blanking period of the color video signal. The reason is to prevent the mode switching section from appearing on the screen. By introducing the mode signal for every field, the influence of possible erroneous mode setting caused by noises or the like can be minimized. The mode introduction protective circuit 81 is to prevent the introduction of a faulty mode in such a case of a change in the field length at mode transition, for example.

The synchronizing signal RES can be such a signal which is included in the vertical blanking period, and the vertical sync signal can be used for it, for example.

In addition, the delay circuit 83 provides a time difference for disabling the AND gate 85 after the synchronizing signal RES has been entered to the latch circuit 47 through the AND gate 85, in the case of issuance of the match signal E.

Although the embodiments have been explained by taking an example of the NTSC system, other standard systems are also applicable.

According to this invention, as described above, it becomes possible to establish a constant phase relation between the crosstalk chrominance signal component in the luminance signal before signal processing and the color subcarrier of the chrominance signal after signal processing, whereby when the luminance signal and chrominance signal are summed after signal processing, the deterioration of picture quality due to the interference between the chrominance signal and its crosstalk component in the luminance signal can be minimized.

Moreover, according to this invention, when the color difference signal is processed on the point-sequential basis, the deterioration in transition characteristics of the color signal attributable to the point sequence can be minimized by making sampling points nearer.

Moreover, according to this invention, in the mosaic process of the case of point-sequential process for the color difference signals, the signal switching position can be made virtually consistent by making the introduction phase of color difference signals closer at D/A conversion, whereby a color change in mosaic can be prevented from occurring.

Moreover, according to this invention, a large number of modes can be specified using a small number of signal lines by transferring the mode signal in a serial manner, whereby erroneous introduction of the mode signal can be prevented by means of a mode signal introduction protection.

What is claimed is:

1. A method of processing a color video signal comprising the steps of:

separating a composite color video signal into a luminance signal and a chrominance signal;

producing a color subcarrier;

demodulating the separated chrominance signal into color difference signals;

storing the separated luminance signal and the color difference signals in memory means;

reading out the stored luminance signal and color difference signals from said memory means in units of one-field period, said field period being adjusted to be extended or shortened in length in reading out said memory means thereby to fix the phase relation between a residual chrominance signal component in the luminance signal read out of said memory means and a chrominance signal which is produced by modulating the color subcarrier with color difference signals read out of said memory means;

performing an intended signal processing for the signals read out of said memory means;

modulating the color subcarrier with processed color difference signals to produce the chrominance signal; and mixing the chrominance signal with the processed luminance signal to produce a composite color video signal.

2. A method of processing a color video signal according to claim 1, wherein said memory readout step includes a step for adjusting said field period to extend or shortened by a same length alternately for every certain number of field periods.

3. A method processing a color video signal according to claim 1, wherein said signal processing step comprises a step of reading out the luminance signal and color difference signals from said memory means iteratively to output these signals.

4. A method of processing a color video signal according to claim 3, wherein said memory readout step sets the amount of extention or contraction of the field period length for one reading to an odd multiple of half the period of the color subcarrier.

5. A method of processing a color video signal according to claim 4, wherein said memory readout step sets an equal amount of extention and contraction of the field period length.

6. A method of processing a color video signal according to claim 1, wherein said memory readout step includes a step for adjusting said field period to extend or shortened in length alternately for every certain number of field periods.

7. A method of processing a color video signal according to claim 3, wherein said memory readout step sets the field length of reading to a multiple of the period of the color subcarrier.

8. A method of processing a color video signal according to claim 1, wherein said memory reading step has an equal frequency for a clock signal which prescribes the timing of memory writing and a clock signal which prescribes the timing of memory reading.

9. A method of processing a color video signal according to claim 8, wherein said memory reading step has the read clock locked in phase to the color subcarrier.

10. A method of processing a color video signal according to claim 9, wherein said memory reading step has the read clock signal and the write clock signal provided by a same signal source.

11. A method of processing a color video signal according to claim 10, wherein said clock signals are produced by multiplying the horizontal sync signal of the separated luminance signal.

12. A method of processing a color video signal according to claim 11, wherein the phase of the color subcarrier is synchronized to the phase of the burst signal in the separated chrominance signal.

13. A method of processing a color video signal according to claim 9 or 10, wherein the memory write clock is produced by multiplying the horizontal sync signal of the separated luminance signal and said memory read clock is produced by multiplying the color subcarrier.

14. A method of processing a color video signal according to claim 13, wherein the color subcarrier of the separated chrominance signal and the horizontal sync signal of the separated luminance signal have frequencies which comply with the relation of a standard television system, and said color subcarrier is in-phase with the burst signal in the separated chrominance signal.

15. A method of processing a color video signal according to claim 13, wherein the color subcarrier of the separated chrominance signal and the horizontal sync signal of the separated luminance signal have frequencies which do not comply with the relation of a standard television system, and the color subcarrier is provided by an independent oscillator.

16. A method of processing a color video signal comprising the steps of:

separating a composite color video signal into a luminance signal and a chrominance signal;

producing a color subcarrier;

demodulating the separated chrominance signal into color difference signals;

storing the separated luminance signal and the color difference signals in memory means;

reading out the stored luminance signal and color difference signals from said memory means, the reading of the luminance signal and color difference signals from said memory being timed for each field thereby to fix the phase relation between a residual chrominance signal component in a luminance signal read out of said memory means and a chrominance signal which is produced by modulating the color subcarrier with color difference signals read out of said memory means;

performing an intended signal processing for the signals read out of said memory means;

modulating the color subcarrier with processed color difference signals to produce the chrominance signal; and mixing the chrominance signal with the processed luminance signal to produce a composite color video signal.

17. A method of processing a color video signal according to claim 1 or 16, wherein the color subcarrier of the separated chrominance signal and the horizontal sync signal of the separated luminance signal have frequencies which do not comply with the relation of a standard television system.

18. A method of processing a color video signal according to claim 16, wherein said memory readout step synchronizes the readout timing to the phase of a horizontal sync signal of the separated luminance signal and the color subcarrier.

19. A method of processing a color video signal according to claim 16, wherein said memory reading step adjusts the timing of memory reading such that the number of horizontal scanning lines of reading is an odd number or even number alternately for every one-field reading, the field period length for readout field having the odd number of horizontal scanning lines is an integral multiple of the color subcarrier, and the period length for a readout field having the even number of horizontal scanning lines is an integral multiple of the color subcarrier.

20. A method of processing a color video signal according to claim 19, wherein said memory reading step synchronizes the timing of memory reading to a horizontal sync signal of the separated luminance signal for each readout field.

21. A method of processing a color video signal according to claim 16, wherein said memory reading step has an equal frequency for a clock signal which prescribes the timing of memory writing and a clock signal which prescribes the timing of memory reading.

22. A color video signal processor comprising:

means for separating a composite color video signal into a luminance signal and a chrominance signal;

means for producing a color subcarrier;

means for demodulating the separated chrominance signal into color difference signals;

memory means for storing the separated luminance signal and the color difference signals;

write control means for storing the luminance signal and color difference signals in units of one field in said memory means;

read control means, which includes read clock signal generation means, means for counting the clock signal from said read clock signal generation means, means for producing a read timing signal at each arrival of the count number of said count means to a specified count value, and means for changing a reset timing of said counting means, for reading out the luminance signal and color difference signals from said memory means;

means for modulating the color subcarrier with the readout difference signals to produce a chrominance signal; and means for mixing the chrominance signal with the readout luminance signal to produce a composite color video signal.

23. A color video signal processor according to claim 22, wherein said reset timing changing means operates to alter the reset count value of said counting means alternately for every certain number of field periods.

24. A color video signal processor comprising:

means for separating a composite color video signal into a luminance signal and a chrominance signal;

means for producing a color subcarrier;

means for demodulating he separated chrominance signal into color difference signals;

memory means for storing the separated luminance signal and the color difference signals;

write control means for storing the luminance signal and color difference signals in units of one field in said memory means;

read control means, which includes means for generating a read address of color difference signals and luminance signal stored in said memory means, and means for generating a signal which discriminates a field to be an even-numbered field or odd-numbered field, for reading out the luminance signal and color difference signals from said memory means in units of one-field period based on an address which is derived from said generated address and shifted by a specified value in accordance with an odd discrimination signal;

means for modulating the color subcarrier with the readout color difference signals to produce a chrominance signal; and means for mixing the chrominance signal with the readout luminance signal to produce a composite color video signal.

* * * * *